United States Patent [19]
Wood et al.

[11] Patent Number: 5,740,043
[45] Date of Patent: Apr. 14, 1998

[54] RELATIVE SPIN SPEED TRACTION CONTROL

[75] Inventors: James A. Wood, Spartanburg; David E. Schweikert, Moore, both of S.C.; David A. Greer, Gahanna, Ohio

[73] Assignee: Westinghouse Air Brake Company, Wilmerding, Pa.

[21] Appl. No.: 610,727

[22] Filed: Mar. 4, 1996

[51] Int. Cl.$^6$ .............................. B60T 8/32; B61C 15/08
[52] U.S. Cl. ........................ 364/426.015; 364/426.027; 364/424.024; 303/128; 303/133; 180/197; 246/168.1
[58] Field of Search .................. 364/426.015, 426.01, 364/426.027, 424.024, 426.028; 303/128, 151, 131, 133, 165, 173; 361/236, 238; 188/3 R; 318/52; 246/168.1, 182 A, 182 C, 182 R; 180/197

[56] References Cited

U.S. PATENT DOCUMENTS

| | | | |
|---|---|---|---|
| 4,095,147 | 6/1978 | Mountz | 303/151 |
| 4,347,569 | 8/1982 | Allen, Jr. et al. | 364/426.027 |
| 4,941,099 | 7/1990 | Wood et al. | 364/426.015 |
| 4,987,543 | 1/1991 | Wood et al. | 364/426.027 |
| 5,471,387 | 11/1995 | Wood et al. | 180/197 |

Primary Examiner—Tan Q. Nguyen
Attorney, Agent, or Firm—James Ray & Associates

[57] ABSTRACT

An apparatus for providing relative spin speed traction control on a railway vehicle. Such apparatus includes a wheel spin detection device connected to receive a plurality of input signals; one of such input signals being an externally generated axle rate signal which represents an acceleration/deceleration rate of a particular wheel/axle set being monitored with respect to wheel slippage. This device generates a spin speed selection output signal and a respective axle's wheel spin detection signal. A wheel spin correction device connected to receive as input signals; a power/brake signal which represents when such vehicle is either in a braking mode or not, a spin speed selection output signal and the respective axle's wheel spin detection signal. This device determines the appropriate output force command signal selected from remove, hold and apply and also generates an output signal indicating a spin correction being in progress or not in progress for a respective axle. A wheel spin axle force command signal generating unit connected to receive a power/brake signal, an output force command signal and a signal indicative of spin correction, for generating a re-application jerk limiting output signal and communicating this signal to respective truck 1 and truck 2 propulsion control units. A speed normalization unit connected to receive raw axle speed signals, a power/brake signal, axle rate signals and an output signal representative of car level spin for generating an output signal representative of normalized axle speed.

27 Claims, 10 Drawing Sheets

5,740,043

RELATIVE SPIN SPEED TRACTION CONTROL

CROSS REFERENCE TO RELATED APPLICATIONS

The invention taught in this patent application is closely related to additional inventions which are taught in the following co-pending patent applications:

"PROPORTIONAL POLARITY SHIFT WHEEL SLIDE PROTECTION". This application was filed on May 8, 1995 and bears Ser. No. 08/436,882. This application is also assigned to the assignee of the present application.

"SIMPLIFIED PATTERN RECOGNITION WHEEL SLIDE PROTECTION". This application was filed on Jun. 2, 1995 and bears Ser. No. 08/460,200 now U.S. Pat. No. 5,654,889. This application is also assigned to the assignee of the present application.

Each of these applications are incorporated herein by reference thereto.

FIELD OF THE INVENTION

The present invention relates, in general, to railway propulsion systems and, more particularly, this invention relates to a propulsion system utilized on a passenger transit, or similar type railway vehicle and has as its primary purpose the modulation of the propulsion forces being applied to such railway vehicle to correct for wheel spin at both low and high speeds.

BACKGROUND OF THE INVENTION

Numerous approaches have been developed by railway brake system manufacturers, prior to the present invention, to control wheel spin during braking and/or the application of power. One such prior art process is taught in U.S. Pat. No. 4,987,543, and entitled "ENERGY STORAGE WHEEL SPIN CONTROL" works well at low speeds but this process allows slow breakaway spins to occur and get out of hand at higher speeds.

Additional background information regarding prior art wheel slippage control logic based on axle speed and acceleration rate is provided in U.S. Pat. No. 4,941,099, and entitled "ADHESIVE ADAPTIVE WHEEL SLIDE PROTECTION PROCESS" which is also assigned to the assignee of the present invention.

Another method of detecting wheel spin and determining the severity of such wheel spin is described in U.S. Pat. No. 5,471,387, issued Nov. 28, 1995 and entitled "A METHOD OF AND APPARATUS FOR THE COMBINED DETECTION AND DETERMINATION OF WHEEL SLIP INTENSITY OF A RAILWAY VEHICLE BRAKE SYSTEM". This patent is likewise assigned to the assignee of the present invention and is incorporated herein by reference thereto. The present invention incorporates a spin detection process which is similar to the wheel slide control process taught in this patent.

Additionally, the present invention uses a spin control logic which is similar to the slide control process taught in the co-pending application, which was mentioned above, entitled, "SIMPLIFIED PATTERN RECOGNITION WHEEL SLIDE PROTECTION". This application bears Ser. No. 08/460,200 and was filed on Jun. 2, 1995, and is also assigned to the assignee of the present invention.

More conventional processes, using only a speed difference or a speed difference and an acceleration rate set point type of wheel spin detection and control, cannot be tuned to allow a set percentage of spin to continue at low speeds. This tuning is important when one attempts to optimize efficiency. The present invention includes a combination of speed varying speed difference and a speed varying setpoint version of a relative spin speed level detection. The combination of both of these detection forms gives good detection throughout the speed range and allows a fine control of wheel spin so that acceleration efficiency can be optimized. Additionally, both the detection and correction methods are designed to minimize picking up false detections. These false detections are usually caused by noise on axle acceleration rate signals.

The teachings of U.S. Pat. Nos. 4,491,920 and 4,941,099 are incorporated herein by reference thereto.

SUMMARY OF THE INVENTION

The present invention provides an apparatus for a wheel spin/traction control process on a passenger transit railway type vehicle. This process is specifically designed to work with a variable per truck force modulation arrangement found on many of today's AC motor driven rail vehicle propulsion systems. This system is designed to at least receive externally generated signals representing the speed of the axle and the acceleration/deceleration rate of the axle being monitored with respect to wheel slippage and for generating and communicating a spin speed selection output signal representative of an actual spin speed value and for generating and communicating a respective axle's wheel spin detection signal.

A wheel spin correction device is disposed on such railway vehicle and is connected to receive a second set of input signals. One of such input signals being an externally generated and communicated power/brake signal which represents when such vehicle is in one of a braking mode and a non braking mode. At least two of the other input signals being the spin speed selection output signal representative of an actual spin speed value and the other being the respective axle's wheel spin detection signal.

The apparatus utilizes these signals to determine a wheel spin timeout value and an axle force command. The wheel spin timeout value is based on the spin speed selection input. A small spin detection will have a low spin speed and be given a short spin enable time out value. A severe spin will be given a longer timeout value. When a wheel spin is detected the apparatus' timer begins the countdown for the wheel spin correction. When the time reaches the timeout value the timer sends out a signal for ending such wheel spin correction.

The wheel spin correction device determines and communicates an appropriate output force command signal selected from remove, hold or apply and also generates and communicates an output signal representative of one of a spin correction being in progress for a respective axle and an absence of a spin correction being in progress for such respective axle.

The apparatus further includes a wheel spin axle force command module that is connected to receive an externally generated power/brake signal, an output force command signal selected from remove, hold and apply, and an output signal representative of spin correction being in progress on a respective axle or the absence of spin correction being in progress on such respective axle. This unit processes the input signals and generates a respective truck 1 and truck 2 re-application jerk limiting output signal to respective truck 1 and truck 2 propulsion control units disposed on such railway vehicle. The unit also determines if a spin correction is occurring on any of the axles and generates an output signal to this effect for use by the other modules.

A speed normalization means is utilized by this process and connected to receive each of the raw axle speed signals, a power/brake signal, axle rate signals from each of the axles and an output signal representative of car level spin indicative of whether a spin correction is occurring on any of the vehicles axles. These signals are processed and this unit generates and communicates an output signal representative of normalized axle speed and an output signal representative of highest axle speed.

OBJECTS OF THE INVENTION

It is, therefore, one of the primary objects of the present invention to provide an improved wheel spin detection and correction arrangement for modulating the propulsion forces on a passenger transit type railway vehicle.

It is another object of the present invention to provide an improved wheel spin detection and correction arrangement for both detection and correction of wheel spin at both low and high speeds.

Additionally, it is still another object of the instant invention to provide an improved wheel spin detection and correction arrangement to minimize false detections that are usually generated by noise on the axle acceleration rate signals.

Yet another object of the present invention is to provide an improved wheel spin detection and correction arrangement which uses a combination of speed varying speed difference and a speed varying setpoint version of a spin speed level detection to give good detection throughout the speed range.

In additions of the several objects and advantages of the invention which have been described above, various other objects and advantages of the present invention will become more readily apparent to those persons who are skilled in the relevant art from the more detailed description of the invention, particularly, when such description is taken in conjunction with the attached drawing Figures and with the appended claims.

DETAILED DESCRIPTION OF THE PRESENTLY PREFERRED EMBODIMENT OF THE INVENTION

Figure 1A:
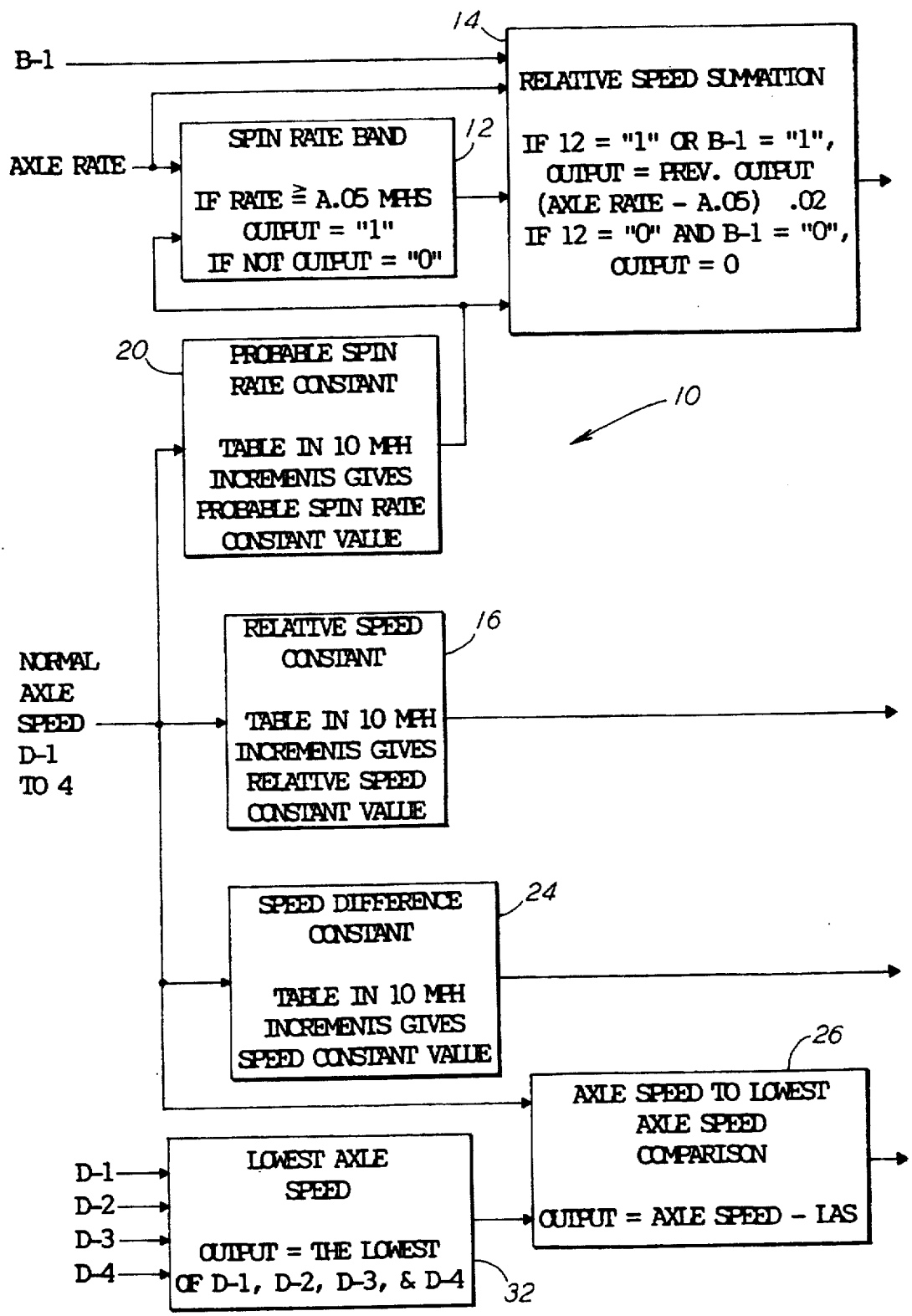
FIGS. 1A–1B are block diagrams of Module A, which is used to detect wheel spin on a per axle basis and to provide some related signals.

Prior to proceeding to the more detailed description of the present invention, it should be noted that, for the sake of clarity and understanding of the invention, identical components having identical functions have been identified with identical reference numerals throughout the several views illustrated in the drawings.

FIG. 1A through FIG. 4C are block diagrams which define the presently preferred apparatus and control functions of the invention. A heavy rail transit vehicle wheel spin protection system using this process will be used as an example to aid in understanding the invention, however, the invention is not limited thereto or thereby.

This example assumes microprocessor control with a 20 millisecond program cycle and uses a per truck variable force modulation approach. With microprocessor control the function of the blocks in these figures are accomplished by lines of code, and the conveyance of information from one block to another is accomplished by one block writing data to the microprocessor's memory, and another block accessing that data from such memory.

The Modules A and B, as are illustrated in FIGS. 1A–1B and 2A–2B, are duplicated as many times as there are axles on the railway vehicle. With microprocessor control each logical or numeric quantity in these figures has as many storage locations as there are axles, one storage location being used for data from the corresponding axle.

The present invention provides an improved wheel spin traction control arrangement designed to work with variable per truck force modulation systems found on many of today's AC motor driven rail vehicle propulsion systems on passenger railway type vehicles having a plurality of axles upon which wheels are disposed. A brief overview of the presently preferred embodiment of this wheel spin control system is described below.

Figure 4A:
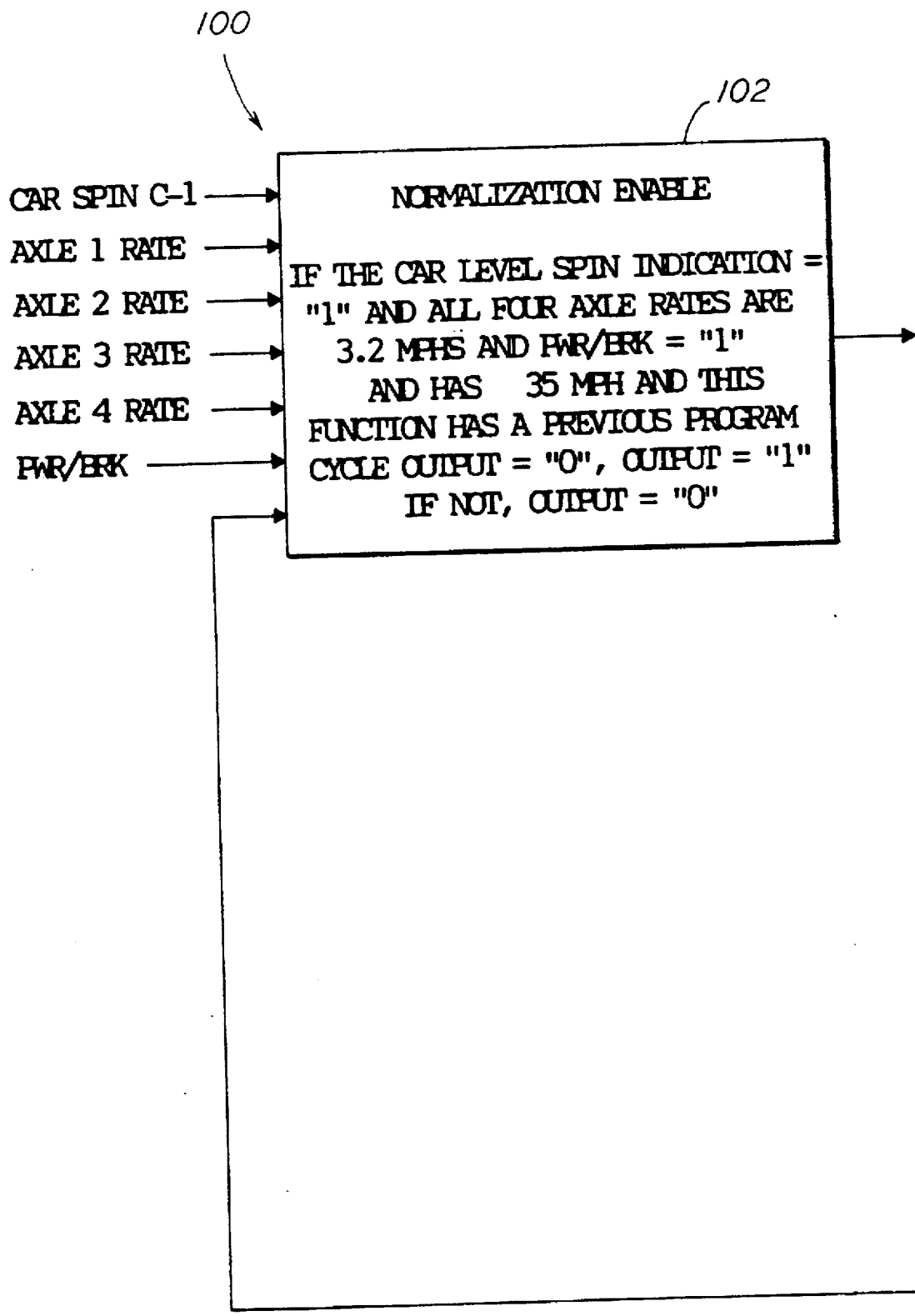
FIGS. 4A–4C are block diagrams of Module D, which provides a means for obtaining the normalized axle speeds and the highest normalized axle speed on a per vehicle basis.
Figure 4B:
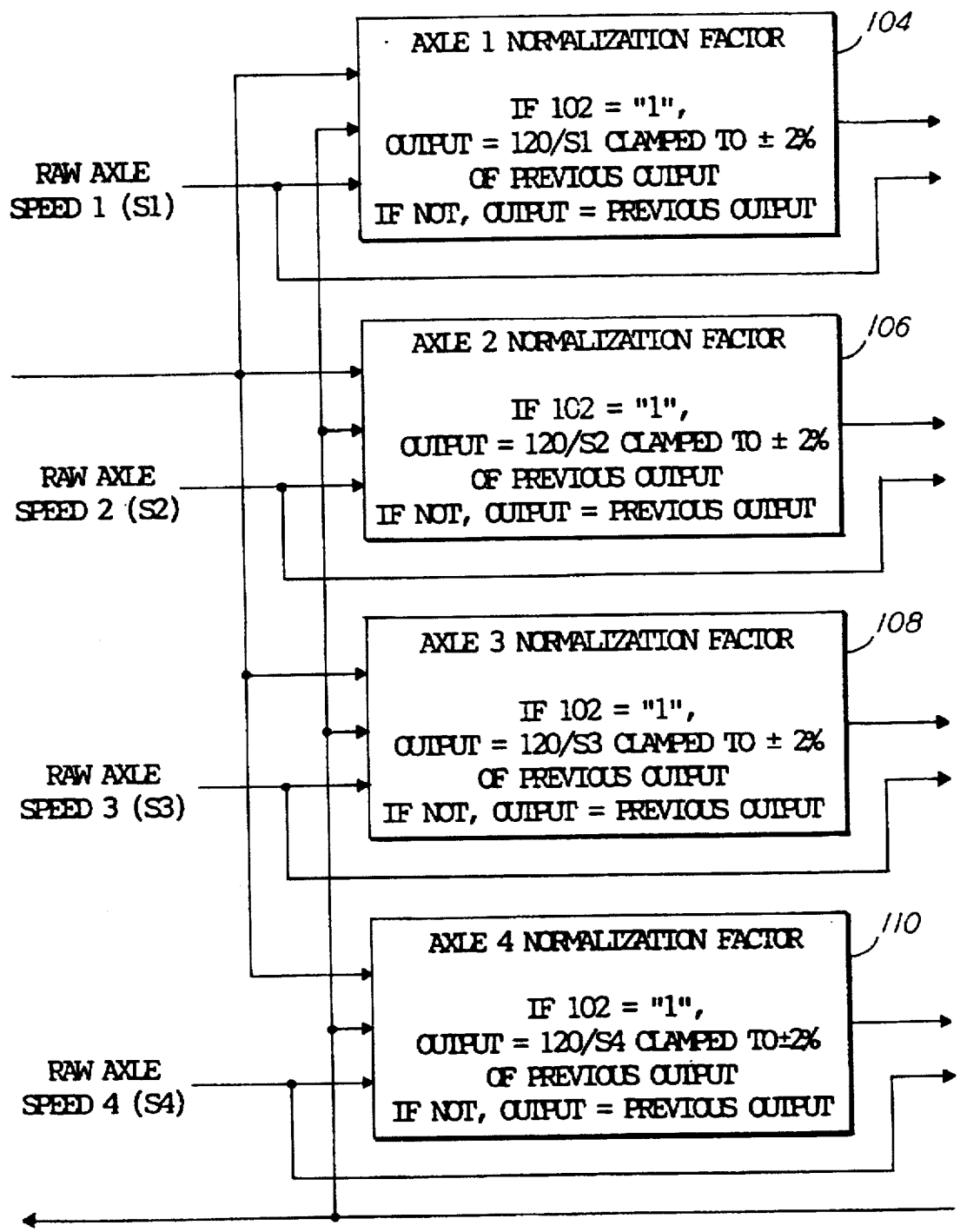
Figure 4C:
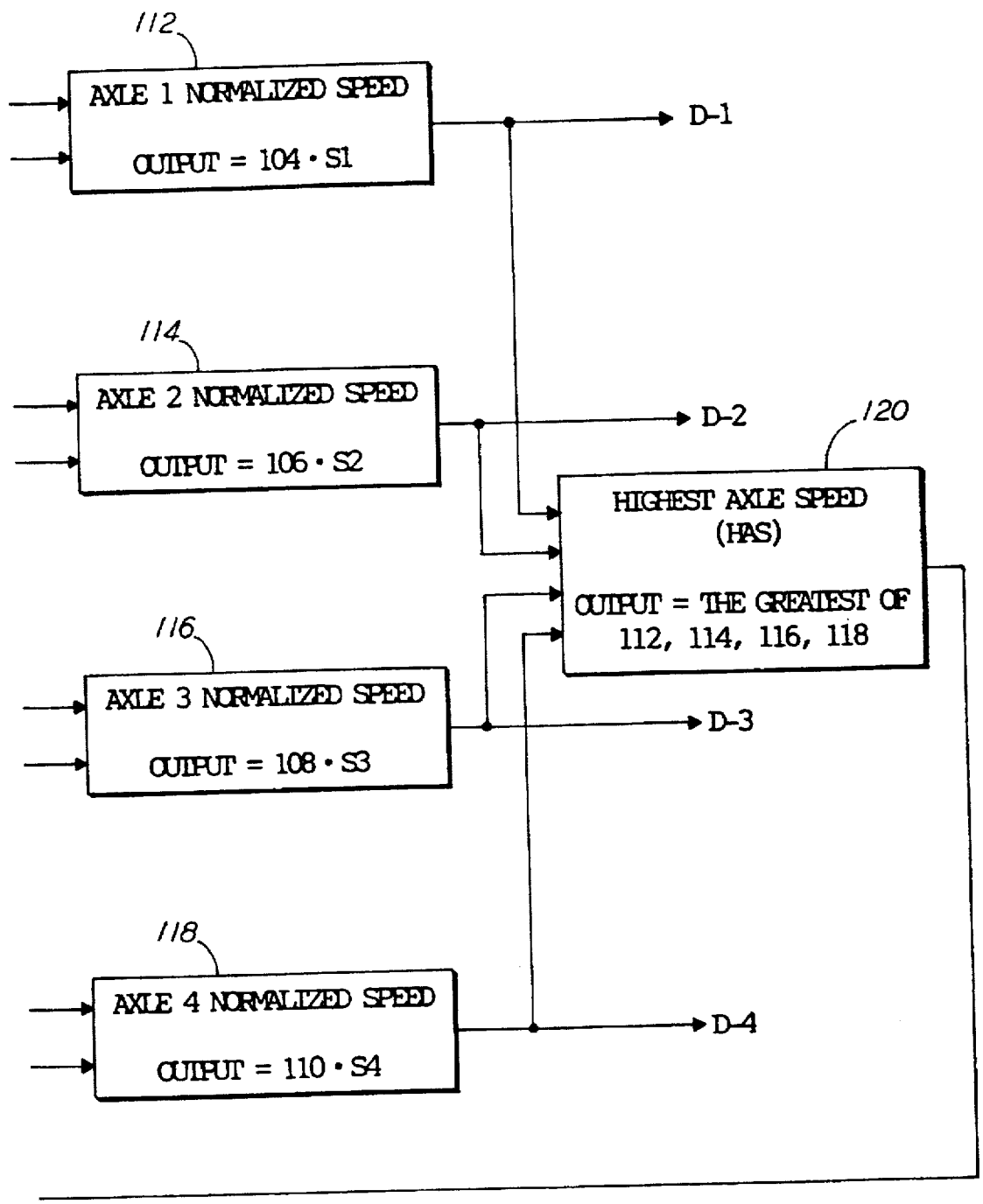

Reference is now made to FIG. 4A–4C. Illustrated therein is an apparatus, generally designated 100, having a plurality of axle speed normalization factor units designated 104, 106, 108 and 110 and a plurality of axle normalized speed units designated 112, 114, 116 and 118, each of these units is connected to at least receive, respective, externally generated and communicated raw axle speed signals indicating the speeds of such respective axles.

During a time when the railway vehicle is moving but when wheel spin is known not to be occurring, normalization factor signals are generated which compensate for differences in wheel diameters, that may be caused by wheel wear. From these normalization factor signals, normalized axle speeds are determined. These normalized speed signals for each respective axle are communicated as inputs on other modules as will be more fully described hereinafter.

For each axle, the normalized wheel axle speed signal is communicated to a relative speed constant unit 16, probable spin rate constant unit 20, and speed difference constant unit 24 illustrated in FIG. 1A. Respective constants are obtained from look up tables that are derived from the normalized axle speed. The axle speed of each of the respective axles is monitored and the lowest axle speed determined. The normalized wheel axle speed signal is also used as an input to axle speed to lowest axle speed determination unit 26 where it is compared to the lowest axle speed. This speed comparison along with the constant signals determined above are communicated as inputs to a relative speed detector unit 18 and spin speed selection unit 22 to enable a determination of whether a wheel spin is occurring.

A spin rate band unit 12 is also provided to receive signals indicative of the acceleration/deceleration rate (i.e., speed pickup) of each of the respective axles. Spin rate band 12 compares the input axle rate of the respective axle to the output of the probable spin rate constant unit 20 which outputs a signal representative of the acceleration rate that the vehicle could actually produce without wheel spin and any acceleration rate that is in the wheel spin range. There is a relative speed summation unit 14 which receives as input signals the wheel spin enable unit 58 output signal B-1 from wheel spin correction module 50, an axle rate signal from the respective axle being monitored, the output signal from the spin rate band unit 12 and the output signal from the probable spin rate constant unit 20. From these signals the relative speed summation unit 14 generates and communicates an output signal which is provided to a relative speed spin detector unit 18 and a spin speed selection unit 22 for use in determining whether a spin is occurring and whether the axles relative spin speed or speed difference will be used as spin speed for spin control. The output from such relative spin speed unit 18 is communicated to the detection unit 30 as one of the inputs required to produce the respective axle's wheel spin detection signal. Signals from detection unit 30 and spin speed selection unit 22 are sent to other modules as output signals A-1 and A-2, respectively.

Figure 2A:
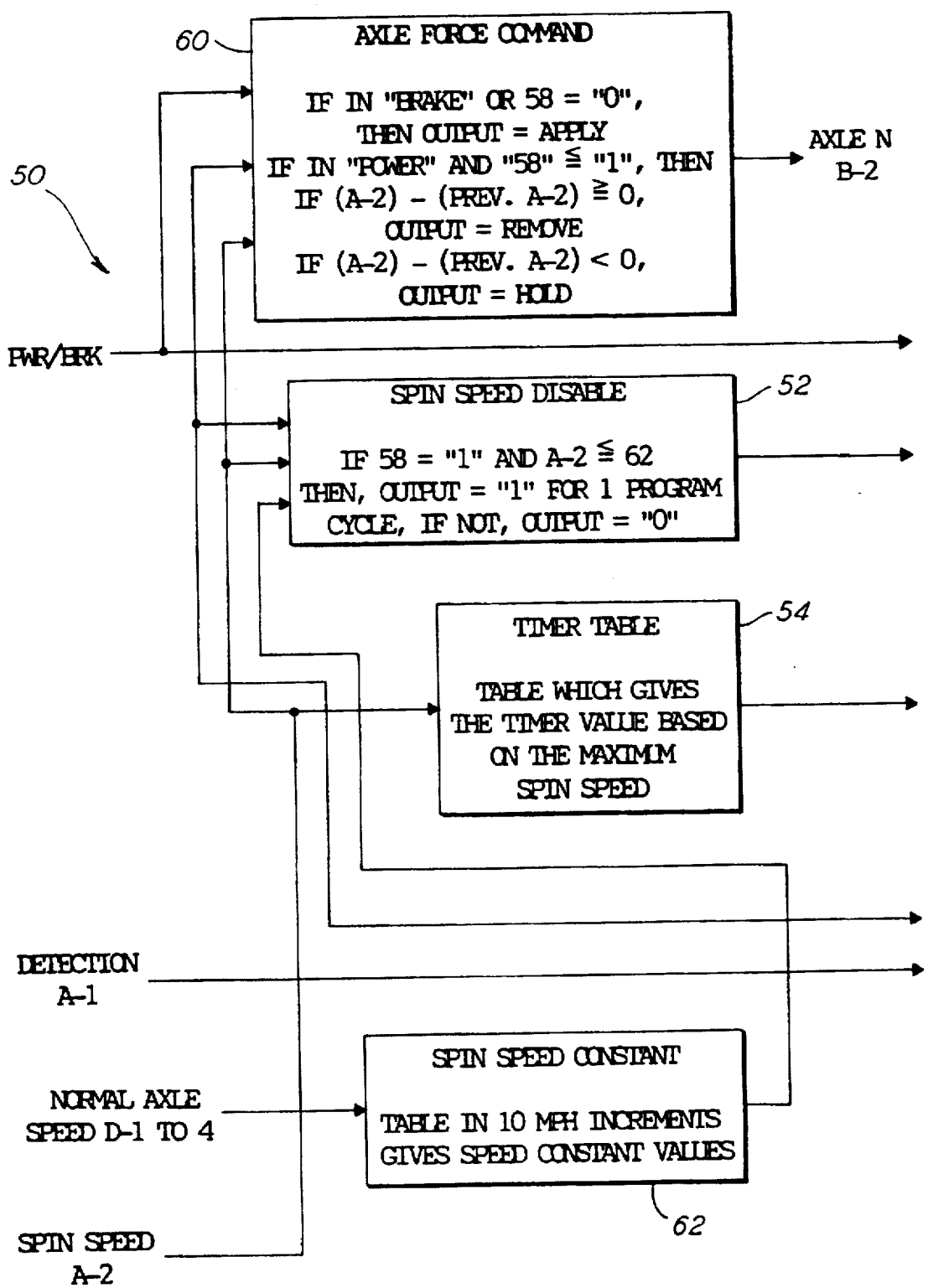
FIGS. 2A–2B are block diagrams of Module B, which provides for wheel spin correction, type of correction, and a timer function on a per axle basis.
Figure 2B:
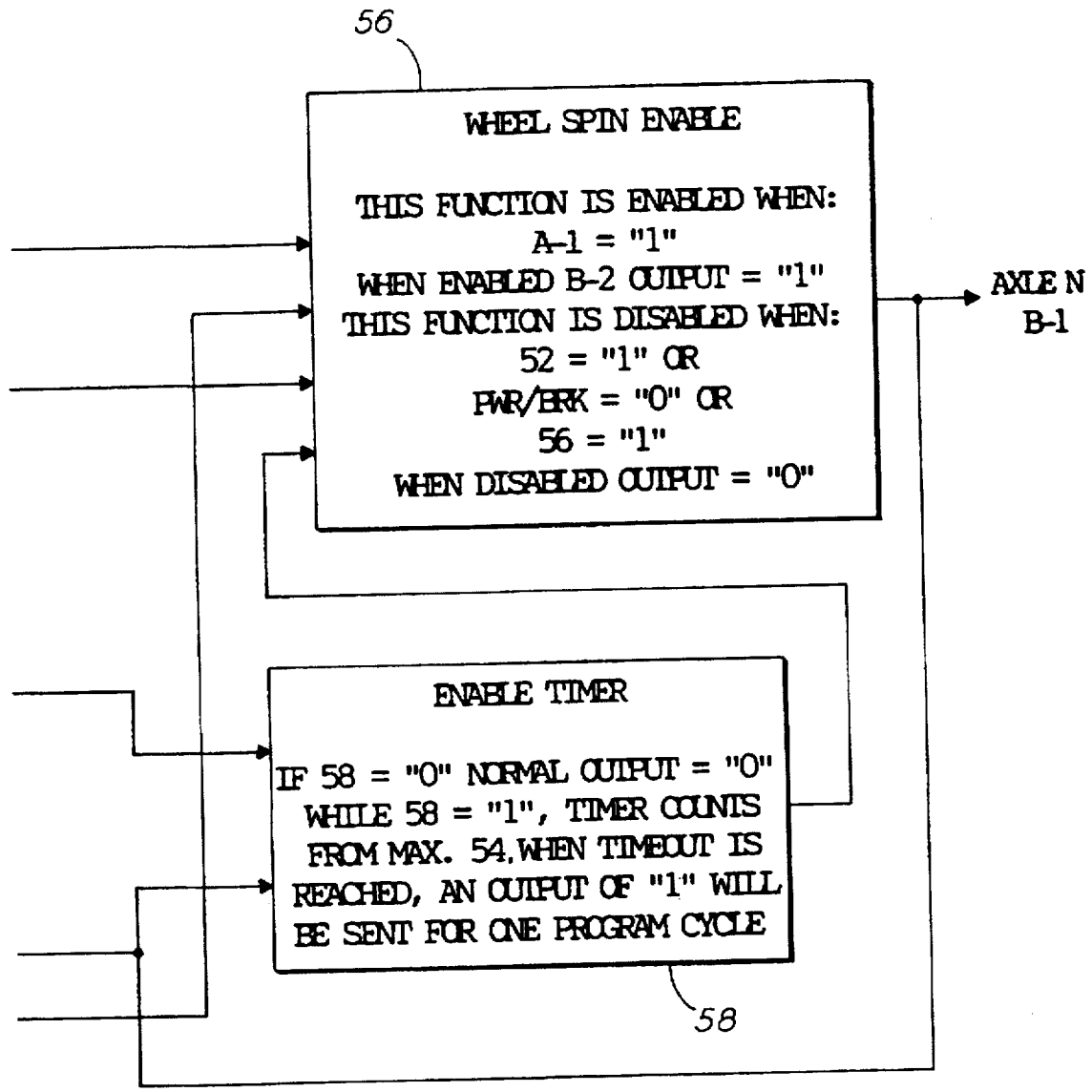

Reference is now made to FIGS. 2A–2B. Illustrated therein is the wheel spin correction module of the present invention, generally designated 50, which includes means for processing as inputs the signals from normalized axle speed, outputs A-1 and A-2 from Module A, and an externally generated Power/Brake signal. A timer table unit 54 provides a timeout value based on the input signal from spin speed selection unit 22 (A-2 from Module A). Enable timer 56, receives as inputs the signals from timer table unit 54 and from wheel spin enable unit 58, and begins the timeout count down whenever the respective axle's wheel spin logic is enabled. This function permits the timeout value to increase while the function is counting down, but will not permit the timeout value to decrease while it is counting down. When the timer has counted down to zero a signal is communicated to the wheel spin enable unit 58. This signal is used as a wheel spin correction indication.

Spin speed constant unit 62 receives the normalized axle speed as an input signal and determines a spin speed constant. This constant is derived from a look up table which gives a spin speed constant for various normalized axle speeds. This constant communicated as a signal, a signal from spin speed selection unit 22 (A-2) and the output signal from wheel spin enable unit 58 are communicated as input signals to spin speed disable unit 52 to determine the appropriate point that a spin has been corrected.

Wheel spin enable unit 58 receives as inputs signals the outputs from detection unit 30 (signal A-1 from module 10), enable timer unit 56, spin speed disable unit 52 and an externally generated signal from the Power/Brake. Wheel spin enable unit 58 generates and communicates an output signal to the logic that a spin correction is or is not in process on the respective axle. This output signal is sent to other modules as a signal B-1.

Axle force command unit 60 receives as inputs the output signals from the Power/Brake, spin speed selection unit 22 (A-2), and wheel spin enable unit 58 to determine the appropriate output force command best suited to control the spin on the respective axle and to communicate an appropriate output force command signal. The three possible command signals are "Remove", "Apply" and "Hold". The output signal of this function is sent to other modules as signal B-2.

Figure 3A:
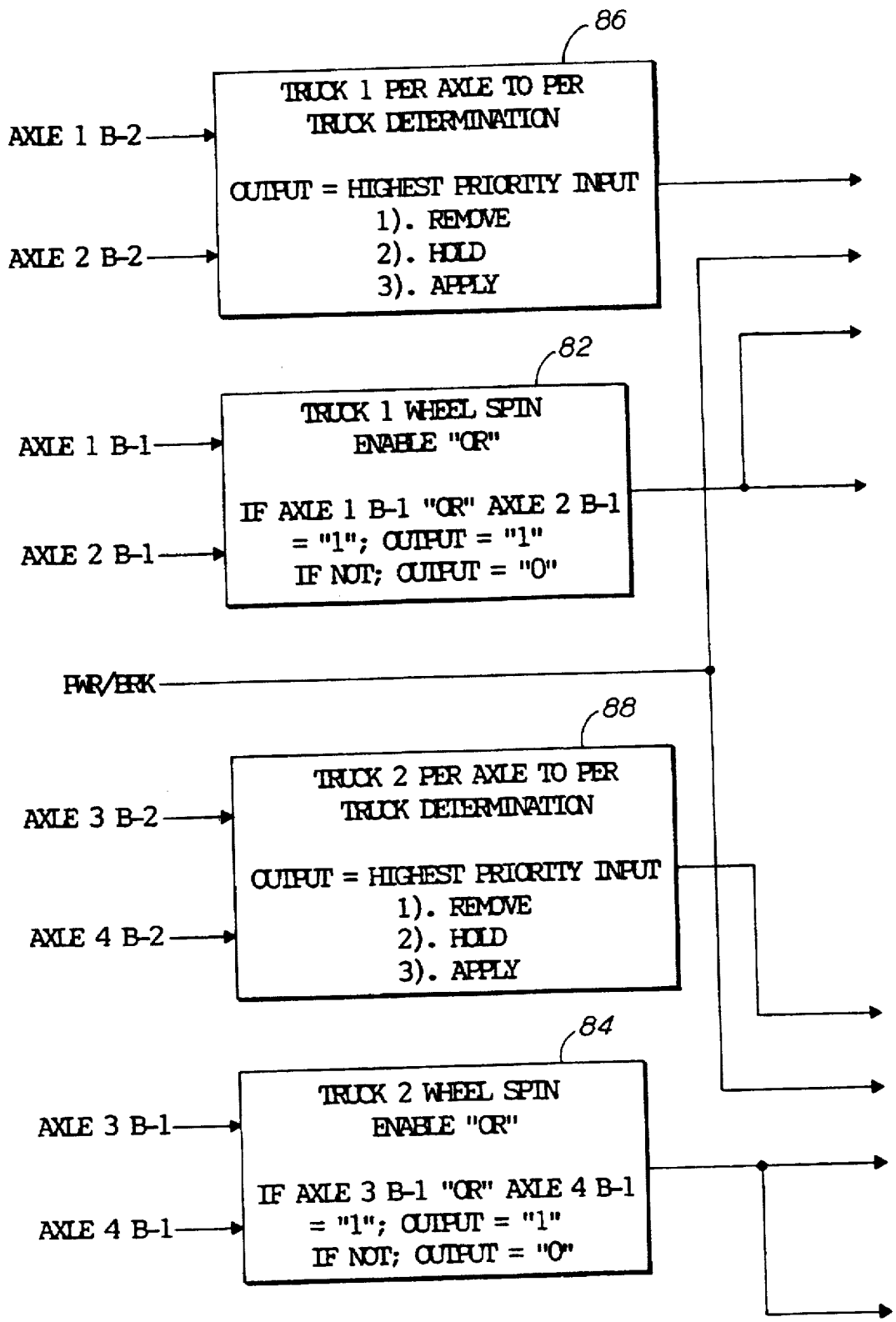
FIGS. 3A–3C are block diagrams of Module C, which provides a means for generating a signal through a series of tests based on normalized axle speeds, axle accelerations, and priority determinations which provide the spin output force modulation commands to the propulsion control systems of the vehicle on a per vehicle basis.
Figure 3B:
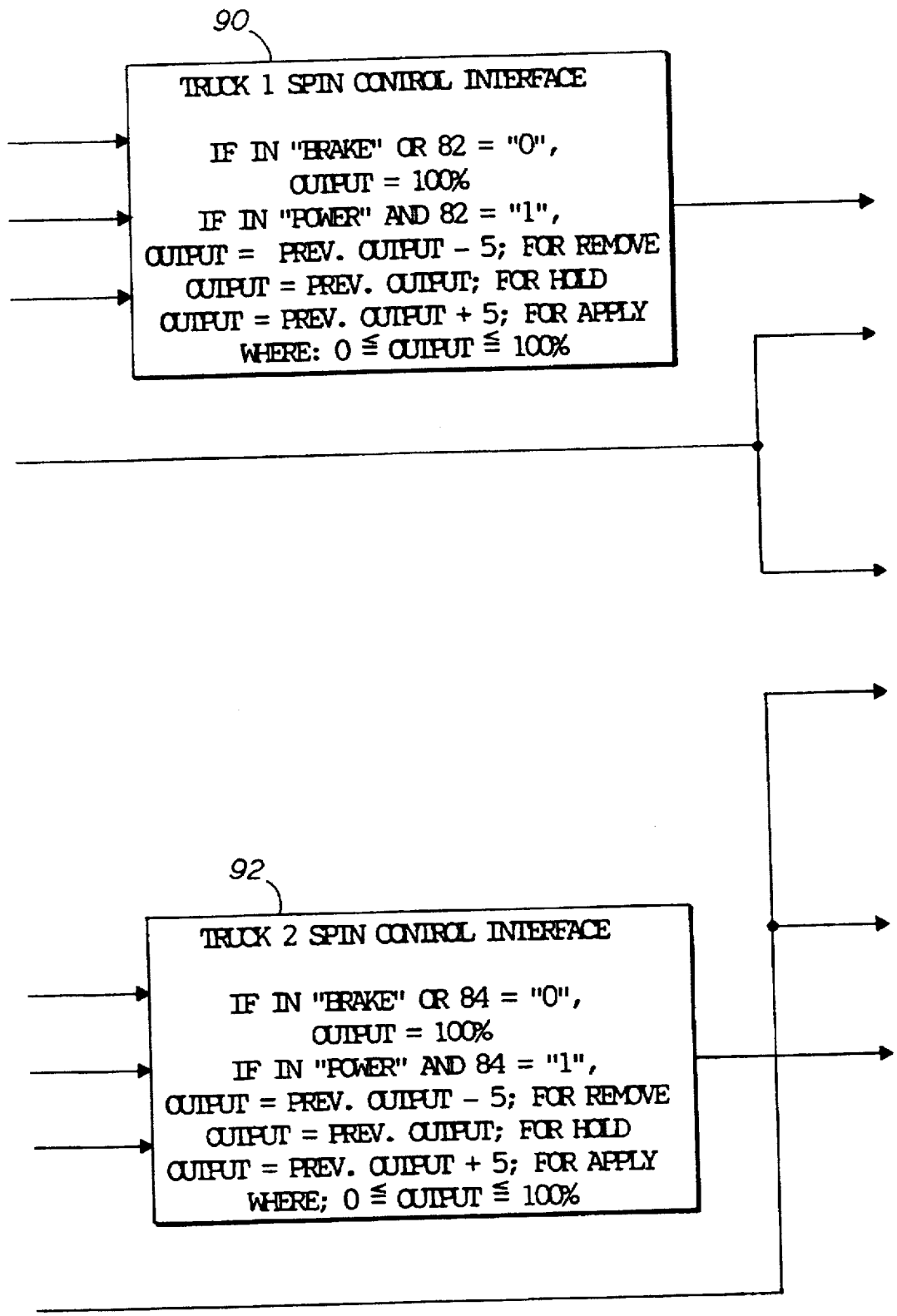
Figure 3C:
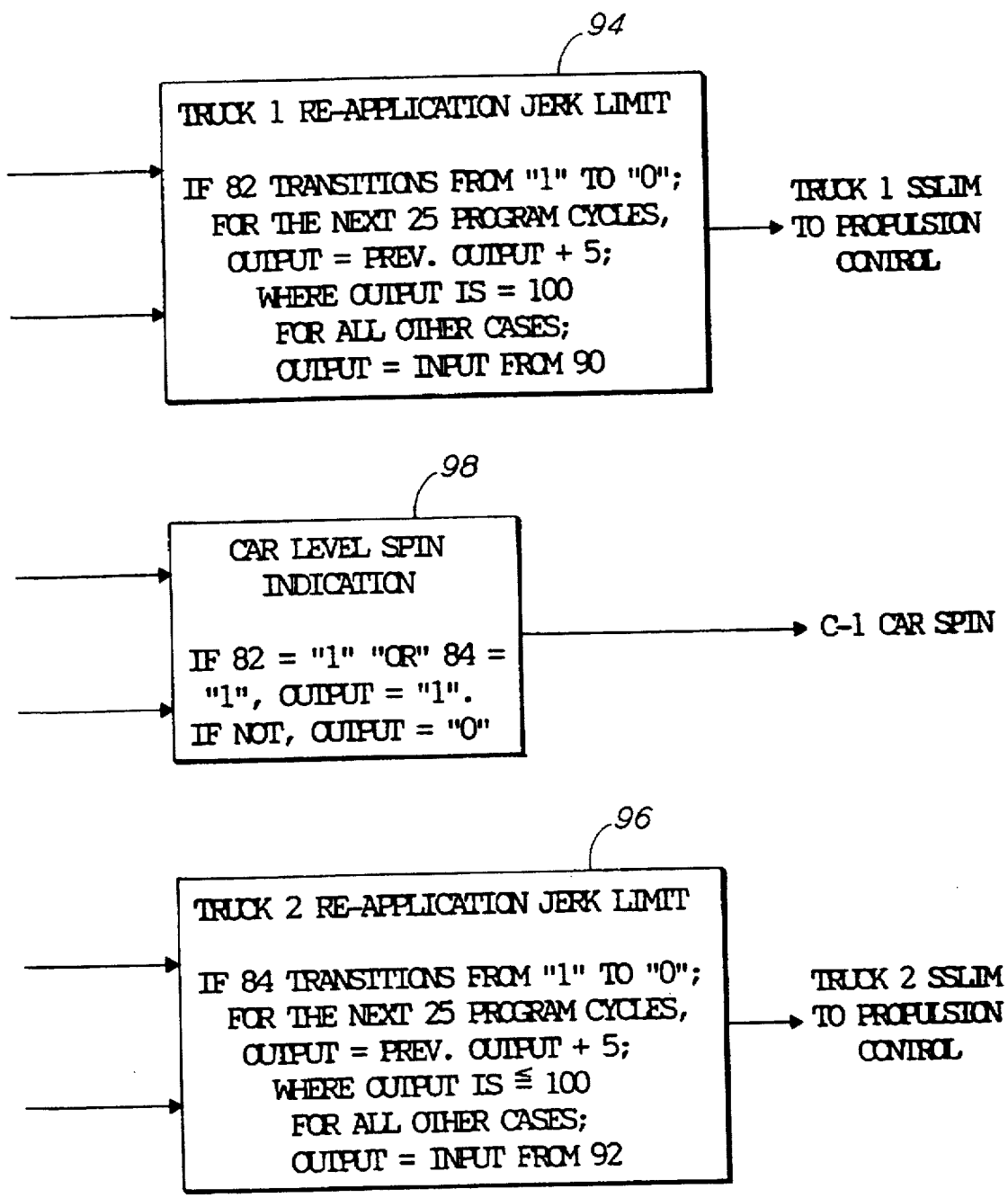

Reference is now made to FIGS. 3A–3C. Illustrated therein is the spin output force modulation module, generally designated 80, provides the cascaded logic required to process the input signals from the Power/Brake, axle force command unit 60 (B-2) and wheel spin enable 58 (B-1). This module 80 generates and communicates the respective Spin/Slide Limit (SSLIM) signal to the propulsion control system of the respective truck. This signal represents a percentage of the propulsion system's requested torque output from the traction motor on each respective truck.

Truck 1 wheel spin enable "OR" unit 82 receives as inputs signals from wheel spin enable unit 58 (B-1) for the respective axles on truck 1 to determine and communicate if either of the axles are enabled to control a spin. Truck 1 per axle per truck determination unit 86 receives as inputs signals from axle force command unit 60 (B-2) for the respective axles on Truck 1 to determine the axle on Truck 1 which has the highest priority spin control force modulation command and then communicating that command to the truck 1 spin control interface unit 90. "Remove" has the highest priority, because if the axle's control logic is calling for a remove, it has the most severe spinning. At the other extreme, if the axle's control logic is calling for an "Apply", it is not in danger of spinning.

Truck 2 wheel spin enable "OR" unit 84 and truck 2 per axle to per truck determination unit 88 perform the identical functions for truck 2 as described above for truck 1.

Truck 1 spin control interface unit 90 receives as inputs signals from truck 1 wheel spin enable "OR" unit 82, truck 1 per axle per truck determination unit 86, and the externally generated Power/Brake signal and converts the wheel spin modulation command signals to a percentage of the propulsion demand signal from Truck 1 and communicates such signal.

Truck 1 re-application jerk limit unit 94 receives as inputs signals from truck 1 wheel spin enable "OR" unit 82 and truck 1 spin control interface unit 90 and performs a re-application jerk limiting function on truck 1's SSLIM (Spin/Slide Limit) signal after completing a spin correction. The output signal of such re-application jerk limit unit 94 is sent to the Propulsion/Electric Brake interface for truck 1.

Truck 2 spin control interface unit 92 and truck 2 re-application jerk limit unit 96 perform the same functions for truck 2 as the functions previously described with respect to units 90 and 94, respectively, for truck 1.

Car level spin indication unit 98 receives as inputs the output signals from wheel spin enable "OR" units (82,84) from both trucks and determines if a spin correction is occurring on any of the vehicle's axles. The output of car level spin indication unit 98 is designated as C-1 Car Spin and communicated to normalization enable unit 102 of speed normalization unit 100.

Reference is now made, more particularly, to FIGS. 1A through FIG. 4C which are block diagrams of the wheel spin control arrangement which are provided for reference purposes during the detailed description of a presently preferred embodiment of this invention.

Although not to be limited thereto and/or thereby, a heavy rail transit vehicle wheel spin protection system using this process will be used as an example. This example assumes microprocessor control with a 20 millisecond program cycle and uses a per truck variable force modulation approach. It should be noted that anyone skilled in the art could apply this approach to other steel wheel to steel rail vehicle applications.

The invention example makes use of the following process input signals:

AXLE RATE (four; one/axle)—This signal is the acceleration/deceleration rate of the wheel/axle set which is being monitored for slippage. It is developed from the differentiation of the speed signal which is externally supplied to the unit using this process by an outside source (i.e., speed pickup). Note; this process is to be used individually for each wheel\axle set to be monitored. RAW AXLE SPEED (four; one/axle)—This signal is the speed of the wheel/axle set which is being monitored for slippage. It is provided by an externally supplied signal (i.e., speed pickup) to the unit using this process. Further, the presently preferred embodiment of the invention being described in conjunction with this example makes use of the following output process signals:

SPIN/SLIDE LIMIT "SSLIM" (two; one/truck)—This signal is the output from the spin control to the propulsion system. This signal represents a percentage of the propulsion systems requested torque output from the traction motor(s) on each respective truck. (Note, the propulsion control reads the command trainline, smooths out sharp changes in command, and modifies the signal based on vehicle weight. At this point the torque needed from the traction motor(s) on each truck is formed. It is at this point that the SSLIM signal is used to modulate the propulsion output.) The SSLIM for a truck is sent from the spin control to the propulsion control as an electrical signal. For example, Spin/Slide Limit; 1.0 VDC=100% to 9.0 VDC=0%. For the wheel spin detection unit 10 portion—Module A, of the present invention, particular reference is now made to FIGS. 1A-1B. Illustrated therein is a presently preferred embodiment of the wheel spin detection unit 10 portion. It should be understood by persons skilled in the art that the function of such Module A will be performed for each of he individual axles disposed on the vehicle.

Module A includes the spin band rate unit, designated 12 in FIG. 1A, which is connected to receive the following as input signals thereto:

AXLE RATE—This signal is the acceleration/deceleration rate of the wheel/axle set which is being monitored for slippage and it is developed from the differentiation of the speed signal which is externally supplied to the unit using this process by an outside source (i.e. a speed pickup device).

PROBABLE SPIN RATE CONSTANT—This input signal is the output of function 20 and this function determines the axle acceleration rate change where wheel spin can be expected. This range varies with car speed.

According to the present invention, the input axle rate is compared to an acceleration rate level provided by the probable spin rate constant function. This level is set to be indicative of the border line between an acceleration rate that the vehicle could actually produce without wheel spin and any acceleration rate that is in the wheel spin range.

If the axle rate signal is greater than or equal to the probable spin rate constant then the output signal from the spin rate band unit 12 will be a logical "1". If the axle rate signal is less than the probable spin rate constant then the output signal from the spin rate band unit 12 will be a logical "0".

Further included in Module A is the relative speed summation unit, designated 14, which is connected to receive as inputs thereto: WHEEL SPIN ENABLE—This is signal B-1 from the wheel spin correction unit 50—Module B. This function is used to determine whether the respective axle is in a spin control situation. A logical "1" from this input indicates a spin control situation. A logical "0" from this input indicates that this axle is not undergoing spin control.

AXLE RATE—This signal is the acceleration/deceleration rate of the wheel/axle set which is being monitored for slippage. It is developed from the differentiation of the speed signal which is externally supplied to the unit using this process by an outside source (i.e., a speed pickup device).

SPIN RATE BAND—This signal is the output of the spin rate band unit 12. A logical "1" indicates the axle rate is above the detection value while a logical "0" indicates it is not.

PROBABLE SPIN RATE CONSTANT—This signal is the output signal of the probable spin rate constant unit 20. This function determines the axle acceleration rate range where wheel spin can be expected. This range varies with car speed.

According to the presently preferred embodiment of the invention, these input signals are processed such that there is computed a value that is the relative spin speed of the axle while it is in both the wheel spin detection range and the wheel spin correction range.

The relative speed summation unit 14 has as an output signal:

If the input signal from spin band rate unit 12 is equal to a logical "1" OR the input signal from wheel spin enable unit 58 B-1 is equal to a logical "1", then the relative speed summation unit 14 will perform the following summation:

Output=Previous Output+(Axle Rate–A.05)*0.02

If the input signal from spin band rate unit 12 is equal to a logical "0" AND the input signal from wheel spin enable unit 58 B-1 is equal to a logical "0", then the relative speed summation unit 14 will set the output equal to a value of 0.

Wheel spin detection unit 10—Module A, illustrated in FIG. 1, further includes a relative speed constant unit, designated 16, which has the following signal as an input thereto:

NORMALIZED AXLE SPEED—This signal is the output signal D-1 for Axle 1, D-2 for Axle 2, D-3 for Axle 3 or D-4 for Axle 4 from the speed normalization unit 100—Module D. This signal is the respective axles normalized speed signal. This input signal, according to the presently preferred embodiment of the invention, is used to compute an axle speed varying constant, which is used to determine the relative spin speed level where a spin will be formally detected.

The output of the relative speed constant unit 16 is determined by a look up table based on an input signal from the respective axles normalized speed. (With respect to the axle, this input signal may come from D-1, D-2, D-3, or D-4.) The input versus output table for this function is presented as follows:

| NORMALIZED SPEED | RELATIVE SPEED CONSTANT |
| --- | --- |
| 0 to 10 MPH | 1.0 MPH |
| 11 to 20 MPH | 1.2 MPH |
| 21 to 30 MPH | 0.8 MPH |
| 31 to 40 MPH | 0.6 MPH |
| 41 to 50 MPH | 0.4 MPH |
| 51 to 60 MPH | 0.4 MPH |
| 61 to 70 MPH | 0.4 MPH |

Figure 1B:
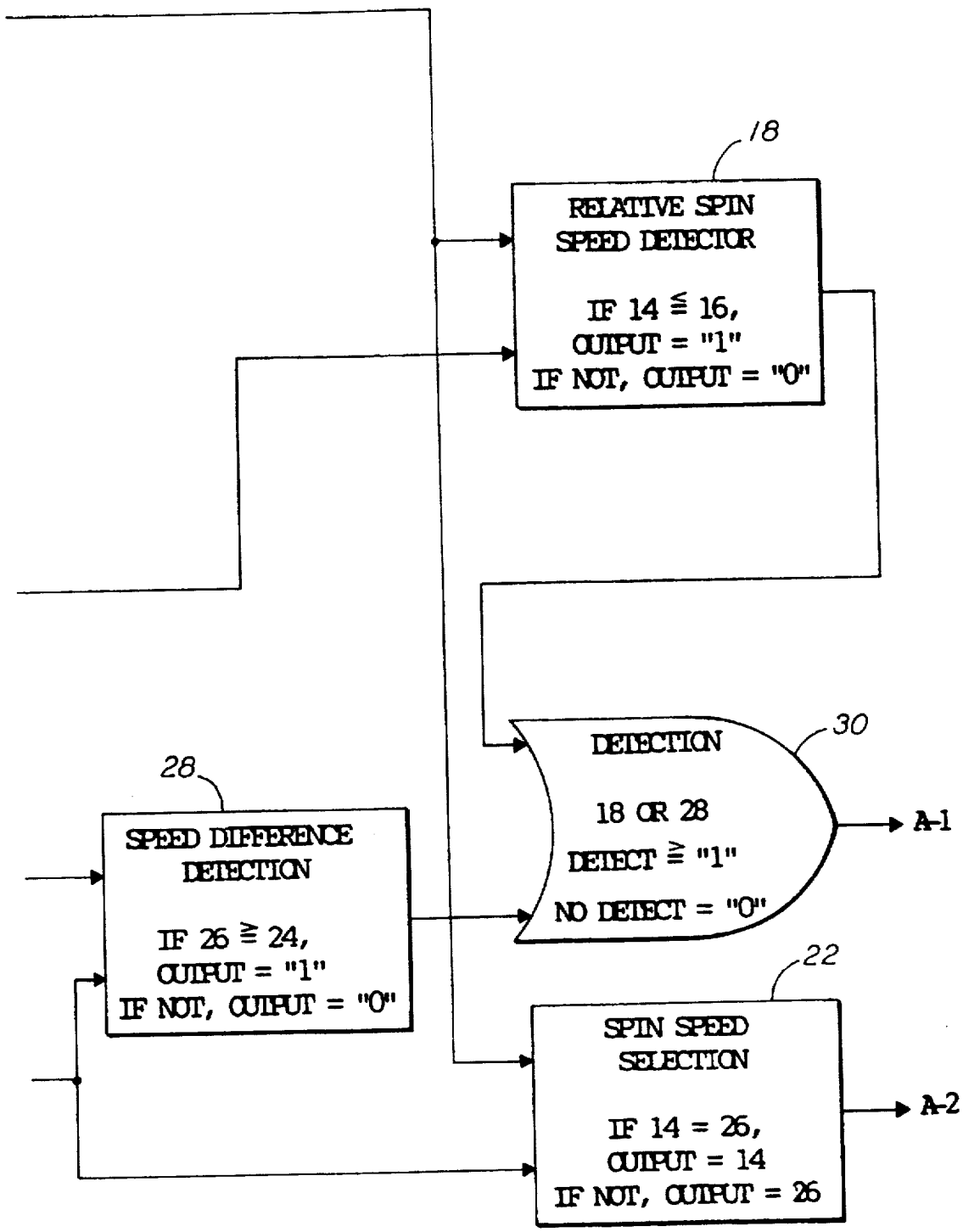

Wheel spin detection unit 10—Module A further includes a relative spin speed detector unit, designated 18 in FIG. 1B, which receives the following signals as inputs thereto:

RELATIVE SPEED SUMMATION—This signal is the output signal from the relative speed summation unit 14. This signal is the summation value of the axle rate times the time step calculated during an axle spin control. If this signal is 0, the axle rate is out of the detection possibility band.

RELATIVE SPEED CONSTANT—This signal is the output signal from such relative speed constant unit 16. This signal is the function which computes an axle speed varying constant, that is used to determine the relative spin speed level where a spin will be formally detected.

The relative spin speed detector unit 18 carries out a process therein which compares the output signal from the relative speed summation unit 14 to the relative speed constant, to make the actual relative spin speed detection indication.

Such relative spin speed detector unit 18 provides an output signal as follows:

If the input signal from the relative speed summation unit 14 is greater than or equal to the input signal from the relative speed constant unit 16 then the output signal from this relative spin speed detector unit 18 will be a logical "1". If, on the other hand, the input signal from the relative speed summation unit 14 is less than the input signal from the relative speed constant unit 16, then the output signal will be a logical "0".

The wheel spin detection unit 10 further includes a probable spin rate constant unit, designated 20 in FIG. 1A, which receives the following signal as an input thereto:

NORMALIZED AXLE SPEED—This signal is the output D-1 for Axle 1, D-2 for Axle 2, D-3 for Axle 3 or D-4 for Axle 4 from Module D. This signal is the respective axles normalized speed signal.

The probable spin rate constant unit 20 determines the axle acceleration rate range where wheel spin can be expected. This range varies with car speed.

This probable spin rate constant unit 20 provides as an output a look up table based on an input signal from the respective axles normalized speed. (With respect to the axle, this input signal may come from D-1, D-2, D-3, or D-4.) The input versus output table for this function is presented as follows:

| NORMALIZED SPEED | PROBABLE SPIN RATE CONSTANT |
|---|---|
| 0 to 10 MPH | 3.3 MPHPS |
| 11 to 20 MPH | 3.2 MPHPS |
| 21 to 30 MPH | 2.8 MPHPS |
| 31 to 40 MPH | 2.3 MPHPS |
| 41 to 50 MPH | 1.8 MPHPS |
| 51 to 60 MPH | 1.3 MPHPS |
| 61 to 70 MPH | 1.2 MPHPS |

The wheel spin detection unit 10—Module A further includes a spin speed selection unit, designated 22, which receives the following signals as inputs thereto:

RELATIVE SPEED SUMMATION—This is the output signal from the speed summation unit 14. This signal is the summation value of the axle rate times the time step calculated during an axle spin control. If this signal is 0, the axle rate is out of the detection possibility band.

AXLE SPEED TO LOWEST AXLE SPEED COMPARISON—This is the output signal of axle speed to lowest axle speed comparison unit 26. This function is used to calculate the difference between the lowest axle speed on the vehicle and the respective axle.

These input signals to the spin speed selection unit 22 are processed in a manner so they may be used to determine whether the axle's relative spin speed or speed difference will be used as the spin speed for spin control. The output signal from such spin speed selection unit 22 is the actual spin speed value.

The output signal of the spin speed selection unit 22 is as follows:

If the input signal from such relative speed summation unit 14 is greater than or equal to the input signal from the axle speed to lowest axle speed comparison unit 26, then the output of this function will be the input from such relative speed summation unit 14. Otherwise the output of this function will be the input signal from axle speed to lowest axle speed comparison unit 26. The output signal of this spin speed selection unit 22 is sent to the other modules and is designated A-2.

Wheel spin detection unit 10—Module A further includes a speed difference constant unit, designated 24. Such speed difference constant unit 24 receives the following as an input signal thereto:

NORMALIZED AXLE SPEED—This signal is the output signal D-1, from Module D, for Axle 1, D-2 for Axle 2, D-3 for Axle 3, and D-4 for Axle 4. This signal is the respective axles normalized speed signal.

Such speed difference constant unit 24 processes this input signal to provide a speed varying value which is used to compare with the axle spin speed difference.

The output of this speed difference constant unit 24 is determined by a look up table based on an input signal from the respective axles normalized speed. (With respect to the axle this input signal may come from D-1, D-2, D-3, or D-4 of Module D.) The input signal versus output table for this function is presented as follows:

| NORMALIZED SPEED | SPIN SPEED CONSTANT |
|---|---|
| 0 to 10 MPH | 3.0 MPH |
| 11 to 20 MPH | 3.0 MPH |
| 21 to 30 MPH | 2.8 MPH |
| 31 to 40 MPH | 2.8 MPH |
| 41 to 50 MPH | 2.5 MPH |
| 51 to 60 MPH | 2.6 MPH |
| 61 to 70 MPH | 3.0 MPH |

An axle speed to lowest axle speed comparison unit, designated 26, is provided in wheel spin detection unit 10—Module A. Such axle speed to lowest axle speed comparison unit 26 receives the following signals as inputs thereto:

NORMALIZED AXLE SPEED—This signal is the output signal D-1 for Axle 1, D-2 for Axle 2, D-3 for Axle 3, and D-4 for Axle 4. This signal is the respective axles normalized speed signal.

LOWEST AXLE SPEED (LAS)—This is the output signal of a lowest axle speed unit 32. This signal is the lowest axle speed signal of the four axles.

Such axle speed to lowest axle speed comparison unit 26 utilizes these input signals to calculate the difference between the lowest axle speed on the vehicle and the respective axles normalized speed.

The output signal from such axle speed to lowest axle speed comparison unit 26 is equal to the signal from the lowest axle speed unit 32 subtracted from the respective axles normalized speed (With respect to the axle this input signal may come from D-1, D-2, D-3, or D-4 of Module D).

Additionally, there is a speed difference detection unit, designated 28, in wheel spin detection unit 10—Module A. Such speed difference detection unit 28 receives the following signals as inputs thereto:

SPEED DIFFERENCE CONSTANT—This is the output signal of speed difference constant unit 24. This signal is an axle speed varying comparison value for the axle speed to lowest axle speed comparison value.

AXLE SPEED TO LOWEST AXLE SPEED COMPARISON—This is the output signal of axle speed to lowest axle speed comparison unit 26. This signal is a value of the speed difference between the axle speed of the respective axle and the lowest speed axle on the vehicle.

Such speed difference detection unit 28 compares the speed varying constant with the respective axles speed difference. Axle speed differences greater than the speed varying constant are considered a speed difference wheel spin detection.

If the input signal from axle speed to lowest axle speed comparison unit 26 is greater than or equal to the input signal from the speed difference constant unit 24, then the output signal of the speed difference detection unit 28 will be a logical "1". If, however, the input signal from such axle speed to lowest axle speed comparison unit 26 is less than the input signal from the speed difference constant unit 24 then the output signal of this speed difference detection unit 28 will be a logical "0".

In addition, wheel spin detection unit 10—Module A includes a detection unit, designated 30. Such detection unit 30 receives the following signals as inputs thereto:

RELATIVE SPIN SPEED DETECTOR—This is the output signal of relative spin speed detector 18. A logical "1" signal indicates a spin on the respective axle has been detected, while a logical "0" signal indicates that the relative spin speed detector unit 18 has not detected a spin on the respective axle.

SPEED DIFFERENCE DETECTION—This signal is the output signal of speed difference detection unit 28. A logical "1" signal indicates that a spin on the respective axle has been detected, while a logical "0" signal indicates that the speed difference detection unit 28 has not detected a spin on the respective axle.

The function of the detection unit 30 is a logical "OR" function. This function OR's the relative spin speed detector unit 18 with the speed difference wheel spin detection unit 28, producing the respective axle's wheel spin detection signal.

According to the presently preferred embodiment of the invention, if the input from the relative spin speed detector unit 18 is equal to a logical "1" OR the input from speed difference detection unit 28 is equal to a logical "1", then the output of this function will be a logical "1". However, if the input from the relative spin speed detector unit 18 is equal to a logical "0" AND the input from the speed difference detection unit 28 is equal to a logical "0", then the output of this function will equal a logical "0". The output of this function is sent to other modules and is designated A-1.

Finally, Module A includes a lowest axle speed unit (LAS), designated 32. Such lowest axle speed unit 32 receives the following signals as inputs thereto:

NORMALIZED AXLE SPEED 1—This signal is the output signal D-1 from Module D. This signal is the speed of wheel/axle set 1, after it has been normalized to correct for wheel size difference.

NORMALIZED AXLE SPEED 2—This signal is the output signal D-2 from Module D. This signal is the speed of wheel/axle set 2, after it has been normalized to correct for wheel size difference.

NORMALIZED AXLE SPEED 3—This signal is the output signal D-3 from Module D. This signal is the speed of wheel/axle set 3, after it has been normalized to correct for wheel size difference.

NORMALIZED AXLE SPEED 4—This signal is the output signal D-4 from Module D. This signal is the speed of wheel/axle set 4, after it has been normalized to correct for wheel size difference.

Such lowest axle speed unit 32 compares all of the vehicle's normalized axle speeds and selects the lowest for an output.

The output signal of the lowest axle speed unit 32 is the lowest of the four normalized axle speed input signals from D-1, D-2, D-3, and D-4.

Particular reference is now made to FIGS. 2A–2B. Illustrated therein is a presently preferred embodiment of a wheel spin correction unit, hereinafter referred to as Module B, which has been generally designated 50. It is important to note that the function of this wheel spin correction unit 50—Module B will be performed for each individual axle on the vehicle.

Module B includes a spin speed disable unit, designated 52, which will receive the following signals as inputs thereto:

WHEEL SPIN ENABLE—This signal is the output signal of the wheel spin enable unit 58. Wheel spin enable unit 58 is used to determine whether the respective axle is in a spin control situation. A signal of a logical "1" from this input indicates a spin control situation. A signal of a logical "0" from this input indicates that this axle is not undergoing spin control.

SPIN SPEED SELECTION—This signal is the output signal A-2 from Module A. This function is used to determine whether the axle's relative spin speed or speed difference will be used as the spin speed for spin control. The input is the actual spin speed value.

SPIN SPEED CONSTANT—This signal is the output signal of spin speed constant unit 62. This function provides a speed varying value which is used to compare with the axle spin speed selection.

The spin speed disable unit 52 processes these input signals to determine the appropriate point that a spin has been corrected. The output signal of the spin speed disable unit 52 is a speed value which varies with axle speed.

If the input signal from wheel spin enable unit 58 is equal to a logical "1" AND the input signal A-2 from the spin speed selection unit 22, from Module A, is less than or equal to the input signal from the spin speed constant unit 62, then the output signal of the spin speed disable unit 52 will be a logical "1" for one program cycle. For all other cases the output signal of this function will be a logical "0".

In addition, wheel spin correction unit 50, Module B, includes a timer table unit, designated 54, which receives the following signal as an input thereto:

SPIN SPEED SELECTION—This is the output signal A-2 of the spin speed selection unit from Module A. This function is used to determine whether the axle's relative spin speed or speed difference will be used as the spin speed for speed control. The input signal is the actual spin speed value.

The timer table unit 54 sets the wheel spin enable timeout value based on the spin speed selection. A small spin speed detection will have a low spin speed and be given a short spin enable timeout value. A severe spin detection will be given a long spin enable timeout value.

The output signal of timer table unit 54 is determined by a look up table based on the input signal A-2 from the spin speed selection unit 22. The input signal versus output table is presented as follows:

| SPIN SPEED SELECTION | TIMEOUT |
|---|---|
| ≦0.4 MPH | 0.2 SEC |
| >0.4 to 0.62 MPH | 0.3 SEC |
| >0.62 to 0.83 MPH | 0.4 SEC |
| >0.83 to 1.06 MPH | 0.5 SEC |
| >1.06 to 1.27 MPH | 0.6 SEC |
| >1.27 to 1.48 MPH | 0.7 SEC |
| >1.48 to 1.70 MPH | 0.8 SEC |
| >1.70 to 1.91 MPH | 0.9 SEC |
| >1.91 to 2.13 MPH | 1.0 SEC |
| >2.13 to 2.34 MPH | 1.1 SEC |
| >2.34 to 2.57 MPH | 1.2 SEC |
| >2.57 to 2.78 MPH | 1.3 SEC |
| >2.78 to 3.00 MPH | 1.4 SEC |
| >3.0 MPH | 1.5 SEC |

Another component of wheel spin correction 50 Module B is an enable timer unit which is designated 56. The enable timer unit 56 receives the following as input signals thereto:

TIMER TABLE—This signal is the output signal of timer table unit 54. This signal gives the wheel spin enable timeout value.

WHEEL SPIN ENABLE—This signal is the output signal of wheel spin enable unit 58. This function is used to determine whether the respective axle is in a spin control situation. A logical "1" from this input signal indicates a spin control situation. A logical "0" from this input signal indicates that this axle is not undergoing spin control.

The enable timer unit 56 begins the timeout count down, whenever the respective axle's wheel spin logic is enabled. This function will then allow the timeout value to increase while the function is counting down, but will not allow the timeout value to decrease while it is counting down. When the timer has counted down to zero a signal is sent out to the wheel spin enable unit 58. This signal is used as a wheel spin correction indication.

If the input signal from wheel spin enable unit 58 is equal to a logical "0", then the output signal from this function will be a logical "0". If the input signal from wheel spin enable unit 58 is equal to a logical "1", then the operation of this function will be affected in the following manner:

When the input signal from wheel spin enable unit 58 changes to a logical "1" a timer will begin counting down from the number of the input signal from the timer table unit 54. If the number of the input signal from the timer table unit 54 increases while the timer is counting down the timer value will be reset to the increased value. If the number of the input signal from the timer table unit 54 decreases, the timer value will continue to count down from the maximum value input from timer table unit 54. During the time when the timer is "Counting Down" the output signal of the enable timer unit 56 will be a logical "0". When the timer reaches "Timeout" the enable timer unit 56 will send out an output signal of a logical "1" for one program cycle.

Wheel spin correction 50 Module B further includes a wheel spin enable unit, designated 58. Such wheel spin enable unit 58 receives the following signals as inputs thereto:

PWR/BRK (POWER/BRAKE)—This signal is a logical "1" when the vehicle is not in a braking mode. This signal is a logical "0" when the vehicle is in a braking mode.

SPIN SPEED DISABLE—This signal is the output signal of spin speed disable unit 52. When the spin speed disable occurs, this signal will be a logical "1" for one program cycle. This signal will be a logical "0" for all other conditions.

ENABLE TIMER—This signal is the output signal of enable timer unit 56. When an enable timeout occurs, this signal will be a logical "1" for one program cycle. This signal will be a logical "0" for all other conditions.

DETECTION—This signal is the output signal A-1 of detection unit 30 from Module A of the respective axle. This signal is a logical "1" when the respective axle's detection logic, in Module A, has detected a potential spin. This signal is a logical "0" under normal operational conditions.

The wheel spin enable unit 58 processes these signals and indicates to the logic that a spin correction is or is not in process, on the respective axle.

The wheel spin enable unit 58 will become "Enabled" when the input signal A-1 of detection unit 30 from Module A is equal to a logical "1". This function will remain "Enabled" until one of the following occurrences "Disables" it:

If the input signal from spin speed disable unit 52 is equal to a logical "1", then this function is "Disabled".

If the externally generated input signal from PWR/BRK is equal to a logical "0", then this function is "Disabled".

If the input signal from enable timer unit 56 is equal to a logical "1", then this function is "Disabled".

When wheel spin enable unit 58 is "Disabled", output signal B-1 will be equal to a logical "0". When wheel spin enable unit 58 is "Enabled", output signal B-1 will be equal to a logical "1".

Additionally, an axle force command unit, designated 60, is also included in wheel spin correction 50 Module B. This axle force command unit 60 receives signals from the following as input signals thereto:

PWR/BRK (POWER/BRAKE)—This signal is a logical "1" when the vehicle is not in a braking mode. This signal is a logical "0" when the vehicle is in a braking mode.

WHEEL SPIN ENABLE—This signal is the output signal of wheel spin enable unit 58. This function is used to determine whether the respective axle is in a spin control situation. A logical "1" from this input signal indicates a spin control situation. A logical "0" from this input signal indicates that this axle is not undergoing spin control.

SPIN SPEED SELECTION—This signal is output signal A-2 of the spin speed selection unit 22 from Module A. This function is used to determine whether the axle's relative spin speed or speed difference will be used as the spin speed for spin control. This input signal is the actual spin speed value.

The axle force command unit 60 processes these input signals to determine the appropriate output force command best suited to controlling the spin on the respective axle. The three possible commands are "Remove", "Hold", and "Apply".

If the externally generated input signal from the PWR/BRK is equal to a logical "0" OR the input signal from wheel spin enable unit 58 is equal to logical "0", then the output signal of the axle force command unit 60 will be "Apply". If the input signal from the PWR/BRK is equal to a logical "1" AND the input signal from wheel spin enable unit 58 is equal to a logical "1", then the following conditions will be considered:

(a). If the input signal from A-2 (spin speed selection unit 22) minus the previous program cycle input signal from A-2 is greater than or equal to 0 (zero), then the output signal of axle force command unit 60 will be "Remove".

(b). If the input signal from A-2 (spin speed selection unit 22) minus the previous program cycle input signal from A-2 is less than 0 (zero), then the output of axle force command unit 60 will be "Hold".

The output signal of the axle force command unit 60 is sent to other modules and is called B-2.

Finally, wheel spin correction unit 50 Module B also includes a spin speed constant unit, designated 62, which receives a signal from the following as an input signal thereto:

NORMALIZED AXLE SPEED—This signal is the output signal D-1 for Axle 1, D-2 for Axle 2, D-3 for Axle 3, and D-4 for Axle 4. This signal is the respective axles normalized speed signal.

The spin speed constant unit 62 provides a speed varying value which is used by spin speed disable unit 52 to compare with the axle spin speed A-2.

The output signal of spin speed constant unit 62 is determined by a look up table based on an input signal from the respective axles normalized speed. (With respect to the axle this input may come from D-1, D-2, D-3, or D-4 of Module D.) The input signal versus output table for this function is presented as follows:

| NORMALIZED SPEED | SPIN SPEED CONSTANT |
| --- | --- |
| 0 to 10 MPH | 0.5 MPH |
| 11 to 20 MPH | 1.1 MPH |
| 21 to 30 MPH | 0.6 MPH |
| 31 to 40 MPH | 0.4 MPH |
| 41 to 50 MPH | 0.3 MPH |
| 51 to 60 MPH | 0.3 MPH |
| 61 to 70 MPH | 0.3 MPH |

Reference is now made, more particularly, to FIGS. 3A–3C. Illustrated therein is a presently preferred embodiment of a spin output force modulation unit, generally designated 80, hereinafter will be referred to as Module C. It should noted that the function of this Module C will be performed on a per vehicle basis.

Module C, spin output force modulation unit 80, includes a truck 1 wheel spin enable "OR" unit, designated 82. Such truck 1 wheel spin enable "OR" unit 82 receives signals from the following as input signals thereto:

WHEEL SPIN ENABLE AXLE 1—This signal is Axle 1 B-1 signal of wheel spin enable unit 22 from Module B. This function is used to determine whether axle 1 is in a spin control situation. A logical "1" from this input signal indicates a spin control situation. A logical "0" from this input signal indicates that this axle is not undergoing spin control.

WHEEL SPIN ENABLE AXLE 2—This signal is Axle 2 B-1 signal of wheel spin enable unit 22 from Module B. This function is used to determine whether axle 2 is in a spin control situation. A logical "1" from this input signal indicates a spin control situation. A logical "0" from this input signal indicates that this axle is not undergoing spin control. This unit determines if either of the two axles on truck 1 are enabled to control a spin.

If signals B-1 Axle 1 OR B-1 Axle 2 are a logical "1", the output signal of the truck 1 wheel spin enable "OR" unit 82 will be a logical "1". Otherwise, if both input signals are a logical "0", the output signal of truck 1 wheel spin enable "OR" unit 82 will be a logical "0".

Module C, spin output force modulation unit 80, also includes a truck 2 wheel spin enable "OR" unit, designated 84, which receives signals from the following as input signals thereto:

WHEEL SPIN ENABLE AXLE 3—This signal is Axle 3 B-1 signal of wheel spin enable unit 22 from Module B. This function is used to determine whether axle 3 is in a spin control situation. A logical "1" from this input signal indicates a spin control situation. A logical "0" from this input signal indicates that this axle is not undergoing spin control.

WHEEL SPIN ENABLE AXLE 4—This signal is Axle 4 B-1 signal of wheel spin enable unit 22 from Module B. This function is used to determine whether axle 4 is in a spin control situation. A logical "1" from this input signal indicates a spin control situation. A logical "0" from this input signal indicates that this axle is not undergoing spin control. This unit determines if either of the two axles on truck 2 are enabled to control a spin.

If signals B-1 Axle 3 OR B-1 Axle 4 are a logical "1", the output of the truck 2 wheel spin enable "OR" unit 84 will be a logical "1". Otherwise, if both input signals are a logical "0", the output signal of truck 2 wheel spin enable "OR" unit 84 will be a logical "0".

Additionally, spin output force modulation unit 80 Module C includes a truck 1 per axle to per truck determination unit, designated 86. Such truck 1 per axle to per truck determination unit 86 receives signals from the following as input signals thereto:

AXLE FORCE COMMAND AXLE 1—This signal is the output signal B-2 of axle force modulation command unit 60 from Module B of axle 1. This function is used to determine the appropriate output force command best suited to controlling the spin on the respective axle. The three possible commands are "Remove", "Hold", and "Apply".

AXLE FORCE COMMAND AXLE 2—This signal is the output signal B-2 of axle force modulation command unit 60 from Module B of axle 2. This function is used to determine the appropriate output force command best suited to controlling the spin on the respective axle. The three possible commands are "Remove", "Hold", and "Apply".

These input signals are used to pick the axle on truck 1 which has the highest priority spin control force modulation command and then send that command to the actual force modulation control logic. "Remove" has the highest priority, because if an axle's control logic is calling for a "Remove", it has the most severe spinning. At the other extreme, if an axle's control logic is calling for an "Apply", it is not in danger of spinning.

The input signal from B-2 of Axle 1 is compared to the input signal from B-2 of Axle 2. The input signal with the highest priority will be the output signal of the truck 1 per axle to per truck determination 86. The priority ranking is as follows:

| PRIORITY | FORCE COMMAND | COMMENTS |
| --- | --- | --- |
| 1 | "REMOVE" - FULL FORCE REDUCTION | HIGHEST |
| 2 | "HOLD" - HOLD FORCE | |
| 3 | "APPLY" - FULL FORCE INCREASE | LOWEST |

Another unit similar to the one previously described is also included in Module C, spin output force modulation unit 80. This is truck 2 per axle to per truck determination unit, designated 88, and receives signals from the following as input signals thereto:

AXLE FORCE COMMAND AXLE 3—This signal is the output signal B-2 of axle force modulation command unit 60 from Module B of axle 3. This function is used to determine the appropriate output force command best suited to controlling the spin on the respective axle. The three possible commands are "Remove", "Hold", and "Apply".

AXLE FORCE COMMAND AXLE 4—This signal is the output signal B-2 of axle force modulation command unit 60 from Module B of axle 4. This function is used to determine the appropriate output force command best suited to controlling the spin on the respective axle. The three possible commands are "Remove", "Hold", and "Apply".

These input signals are used to pick the axle on truck 2 which has the highest priority spin control force modulation command and then send that command to the actual force modulation control logic. "Remove" has the highest priority, because if an axle's control logic is calling for a "Remove", it has the most severe spinning. At the other extreme, if an axle's control logic is calling for an "Apply", it is not in danger of spinning.

The input signal from B-2 of Axle 3 is compared to the input signal from B-2 of Axle 4. The input signal with the highest priority will be the output signal of the truck 2 per axle to per truck determination unit 88. The priority ranking is as follows:

| PRIORITY | FORCE COMMAND | COMMENTS |
|---|---|---|
| 1 | "REMOVE" - FULL FORCE REDUCTION | HIGHEST |
| 2 | "HOLD" - HOLD FORCE | |
| 3 | "APPLY" - FULL FORCE INCREASE | LOWEST |

In addition, spin output force modulation unit 80 Module C also includes a truck 1 spin control interface unit, designated 90. The truck 1 spin control interface unit 90 receives signals from the following as input signals thereto:

TRUCK 1 PER AXLE TO PER TRUCK DETERMINATION—This signal is the output signal of truck 1 to per truck determination unit 86. This function is used to pick the axle on truck 1 which has the highest priority spin control force modulation command. The output signal will be one of three force modulation commands (i.e., "Remove", "Hold", and "Apply").

TRUCK 1 WHEEL SPIN ENABLE "OR" —This signal is the output signal of truck 1 wheel spin enable "OR" unit 82. A logical "1" indicates the truck 1 wheel spin control is enabled (i.e., actively controlling a spin). A logical "0" indicates the truck 1 wheel spin is disabled (i.e., not controlling a spin).

PWR/BRK (POWER/BRAKE)—This signal is a logical "1" when the vehicle is not in a braking mode. This signal is a logical "0" when the vehicle is in a braking mode.

The function of this truck 1 spin control interface unit 90, is to convert the wheel truck spin modulation command signals to a percentage of the propulsion demand, for truck 1.

If the input signal from truck 1 wheel spin enable "OR" unit 82 is equal to a logical "0" OR the input signal from PWR/BRK is equal to a logical "0", then the output signal of truck 1 spin control interface unit 90 will be equal to 100%. If the input signal from truck 1 wheel spin enable "OR" unit 82 is equal to a logical "1" AND the input signal from PWR/BRK is equal to a logical "1", then the output signal of truck 1 spin control interface unit 90 will be formed as follows:

If the input signal from truck 1 per axle to per truck determination unit 86 is equal to "Remove", then Output=Previous Output−5 where: 0≦Output≦100[ ]ps

If the input signal from truck 1 per axle to per truck determination unit 86 is equal to "Hold", then Output=Previous Output If the input signal from truck 1 per axle to per truck determination unit 86 is equal to "Apply", then Output=Previous Output+5 where; 0≦Output≦100[ ]ps

Module C, spin output force modulation unit 80, also includes a duplicate unit for truck 2 to that previously described. This is truck 2 spin control interface unit designated 92. This truck 2 spin control interface unit 92 receives signals from the following as input signals thereto:

TRUCK 2 PER AXLE TO PER TRUCK DETERMINATION—This signal is the output signal of truck 2 per axle to per truck determination unit 88. This function is used to pick the axle on truck 2 which has the highest priority spin control force modulation command. The output of this signal will be one of three force modulation commands (i.e.,"Remove", "Hold", and "Apply").

TRUCK 2 WHEEL SPIN ENABLE "OR" —This signal is the output signal of truck 2 wheel spin enable "OR" unit 84. A logical "1" indicates the truck 2 wheel spin control is enabled (i.e., actively controlling a spin). A logical "0" indicates the truck 2 wheel spin is disabled (i.e., not controlling a spin).

PWR/BRK (POWER/BRAKE)—This signal is a logical "1" when the vehicle is not in a braking mode. This signal is a logical "0" when the vehicle is in a braking mode.

The function of this truck 2 spin control interface unit 92 is to convert the wheel truck spin modulation command signals to a percentage of the propulsion demand, for truck 2.

If the input signal from truck 2 per axle to per truck determination unit 88 is equal to a logical "0" OR the input signal from PWR/BRK is equal to a logical "0", then the output signal of the truck 2 wheel spin interface unit 90 will be equal to 100%. If the input signal from truck 2 wheel spin enable "OR" unit 84 is equal to a logical "1" AND the input signal from PWR/BRK is equal to a logical "1", then the output of the truck 2 wheel spin interface unit 90 will be formed as follows:

If the input signal from truck 2 per axle to per truck determination unit 88 is equal to "Remove", then Output=Previous Output−5 where: 0≦Output≦100[ ]ps

If the input signal from truck 2 per axle to per truck determination unit 88 is equal to "Hold", then Output=Previous Output−5

If the input signal from truck 2 per axle to per truck determination unit 88 is equal to "Apply", then Output=Previous Output+5 where: 0≦Output≦100%

Additionally, spin output force modulation unit 80 Module C includes a truck 1 re-application jerk limit unit, designated 94, which receives signals from the following as input signals thereto:

TRUCK 1 SPIN CONTROL INTERFACE—This signal is the output signal of truck 1 spin control interface unit 90. This function converts the truck wheel spin correction command signals to a percentage of the propulsion demand for truck 1. The output signal of this function will be a percentage from 0 to 100%.

TRUCK 1 WHEEL SPIN ENABLE "OR" —This signal is the output signal of truck 1 wheel spin enable "OR" unit 82. A logical "1" indicates the truck 1 wheel spin control is enabled (i.e., actively controlling a spin). A logical "0" indicates the truck 1 wheel spin is disabled (i.e., not controlling a spin).

This truck 1 re-application jerk limit unit 94 performs a re-application jerk limiting function on the truck's SSLIM signal after completion of a spin correction. The output signal of this truck 1 re-application jerk limit unit 94 is sent to the truck 1 propulsion/electric brake interface.

If the input signal from truck 1 wheel spin enable "OR" unit 82 transitions from a logical "1" to a logical "0", then for the next 25 program cycles (i.e., 0.500 sec.) the following will occur:

Output=Previous Output+5 where; 0≦Output≦100[ ]ps
For all other cases:

Output=Input from truck 1 spin control interface unit 90.

Module C, spin output force modulation unit 80, also includes a truck 2 re-application jerk limit unit, designated 96, which receives signals from the following as input signals thereto:

TRUCK 2 SPIN CONTROL INTERFACE—This signal is the output signal of truck 2 spin control interface unit 92. This function converts the truck wheel spin correction command signals to a percentage of the propulsion demand for truck 2. The output of this function will be a percentage from 0 to 100%.

TRUCK 2 WHEEL SPIN ENABLE "OR" —This signal is the output signal of truck 2 wheel spin enable "OR" unit 84. A logical "1" indicates the truck 2 wheel spin control is enabled (i.e., actively controlling a spin). A logical "0" indicates the truck 2 wheel spin is disabled (i.e., not controlling a spin).

This truck 2 re-application jerk limit unit 96 performs a re-application jerk limiting function on the truck's SSLIM signal after completion of a spin correction. The output signal of truck 2 re-application jerk limit unit 96 is sent to the truck 2 propulsion/electric brake interface.

If the input signal from truck 2 wheel spin enable "OR" unit 84 transitions from a logical "1" to a logical "0", then for the next 25 program cycles (i.e., 0.500 sec.) the following will occur:

Output=Previous Output+5 where; 0≦Output≦100[ ]ps
For all other cases:

Output=Input from truck 2 spin control interface unit 92

Finally, spin output force modulation unit 80 Module C has a car level spin indication unit, designated 98, which receives signals from the following as input signals thereto:

TRUCK 1 WHEEL SPIN ENABLE "OR" —This signal is the output signal of truck 1 wheel spin enable "OR" unit 82. A logical "1" signal indicates the truck 1 wheel spin control is enabled (i.e., actively controlling a spin). A logical "0" signal indicates the truck 1 wheel spin is disabled (i.e., not controlling a spin).

TRUCK 2 WHEEL SPIN ENABLE "OR" —This signal is the output signal of truck 2 wheel spin enable "OR" unit 84. A logical "1" signal indicates the truck 2 wheel spin control is enabled (i.e., actively controlling a spin). A logical "0" signal indicates the truck 2 wheel spin is disabled (i.e., not controlling a spin).

This car level spin indication unit 98 determines if a spin correction is occurring on any of the vehicle's axles.

If the input signal from truck 1 wheel spin enable "OR" unit 82 is equal to a logical "1" OR the input signal from truck 2 wheel spin enable "OR" unit 84 is equal to a logical "1", then the output signal of car level spin indication unit 98 will be a logical "1". If the input signal from truck 1 wheel spin enable "OR" unit 82 is equal to a logical "0" AND the input from truck 2 wheel spin enable "OR" 84 is equal to a logical "0", then the output signal of car level spin indication unit 98 will be a logical "0". This function produces output signal C-1 which is used by other modules.

Reference is made, more particularly, to FIGS. 4A–4C. Illustrated therein is a presently preferred embodiment of a speed normalization unit, generally designated 100, hereinafter will be referred to as Module D. It should be noted that the function of this module will be performed on a per vehicle basis.

Module D, speed normalization unit 100, includes a normalization enable unit, designated 102. Such normalization enable unit 102 receives signals from the following as input signals thereto:

CAR LEVEL SPIN INDICATION—This signal is the output signal C-1 from Module C. This function determines if a spin correction is occurring on any of the vehicle's axles.

AXLE 1 RATE—This signal is the acceleration/deceleration rate of the wheel/axle set which is being monitored for slippage. It is developed from the differentiation of the speed signal which is externally supplied to various units using this process by an outside source (i.e., speed pickup).

AXLE 2 RATE—This signal is the acceleration/deceleration rate of the wheel/axle set which is being monitored for slippage. It is developed from the differentiation of the speed signal which is externally supplied to various units using this process by an outside source (i.e., speed pickup).

AXLE 3 RATE—This signal is the acceleration/deceleration rate of the wheel/axle set which is being monitored for slippage. It is developed from the differentiation of the speed signal which is externally supplied to various units using this process by an outside source (i.e., speed pickup).

AXLE 4 RATE—This signal is the acceleration/deceleration rate of the wheel/axle set which is being monitored for slippage. It is developed from the differentiation of the speed signal which is externally supplied to various units using this process by an outside source (i.e., speed pickup).

PWR/BRK (POWER/BRAKE)—This signal is a logical "1" when the vehicle is not in a braking mode. This signal is a logical "0" when the vehicle is in a braking mode.

HIGHEST AXLE SPEED (HAS)—This signal is the output signal from highest axle speed unit 120. This signal is the highest axle speed signal of the four axles.

Wheel speed normalization is used to remove the relative wheel speed difference found on the vehicle's axles due to differences in wheel diameter. The function of normalization enable unit 102 is to determine the optimum time to perform the wheel speed normalization process. A time when none of the axles are slipping or spinning is the optimum time.

If the input signal C-1 is equal to a logical "0" AND the axle rate input signals from Axle 1, Axle 2, Axle 3, and Axle 4 are all less than 3.2 MPHPS AND PWR/BRK is equal to a logical "1" AND the input signal from highest axle speed unit 120 is greater than 35 MPH AND the normalization enable unit 102 had an output signal of a logical "0" on the previous program cycle, then the normalization enable unit 102 will have an output signal of a logical "1". For any other conditions normalization enable unit 102 will have an output signal of a logical "0".

Module D, speed normalization unit 100, also includes an axle 1 normalization unit, designated 104, which receives signals from the following as input signals thereto:

NORMALIZATION ENABLE—This signal is the output signal of normalization enable unit 102. When the conditions are right to recalculate the normalization scaling factor, this signal will be a logical "1". All other times, this signal will be a logical "0".

HIGHEST AXLE SPEED (HAS)—This signal is the output signal from highest axle speed unit 120. This signal is the highest axle speed signal of the four axles.

RAW AXLE SPEED 1—This signal is the speed of the wheel/axle set which is being monitored for slippage. It is externally supplied to the axle 1 normalization unit 104 by an outside source (i.e., speed pickup).

This axle 1 normalization unit 104 calculates the wheel speed normalization factor for axle 1. When this factor is calculated, it is clamped so that it cannot change more than ±2% from its previous value. This is used to minimize the effect of an anomalous speed signal right at the moment the factor is being calculated.

If the input signal from normalization enable unit 102 is equal to a logical "0", then the output signal of axle 1 normalization factor unit 104 will be the previous program cycle's output signal from this function. If the input signal from normalization enable unit 102 is equal to a logical "1" then the output signal of the axle 1 normalization factor unit 104 is calculated in the following manner:

The output signal from this function will be equal to the input signal from highest axle speed unit 120 divided by the raw axle speed of axle 1, provided that this calculation is within ±2% of this function's previous program cycle output signal. If the calculation is not within ±2% of this function's previous program cycle's output signal it will be limited to 102% or 98% respectively, of this function's previous program cycle's output signal.

An axle 2 normalization factor unit, designated 106, is also included in speed normalization unit 100, and receives signals from the following as input signals thereto:

NORMALIZATION ENABLE—This signal is the output signal of normalization enable unit 102. When the conditions are right to recalculate the normalization scaling factor, this signal will be a logical "1". All other times, this signal will be a logical "0".

HIGHEST AXLE SPEED (HAS)—This signal is the output signal from highest axle speed unit 120. This signal is the highest axle speed signal of the four axles.

RAW AXLE SPEED 2—This signal is the speed of the wheel/axle set which is being monitored for slippage. It is externally supplied to the axle 2 normalization factor unit 106 unit by an outside source (i.e., speed pickup).

This axle 2 normalization factor unit 106 calculates the wheel speed normalization factor for axle 2. When this factor is calculated, it is clamped so that it cannot change more than ±2% from its previous value. This is used to minimize the effect of an anomalous speed signal right at the moment the factor is being calculated.

If the input signal from normalization enable unit 102 is equal to a logical "0", then the output signal of axle 2 normalization factor unit 106 will be the previous program cycle's output signal from this function. If the input signal from normalization enable unit 102 is equal to a logical "1" then the output signal of the axle 2 normalization factor unit 106 is calculated in the following manner:

The output signal from this function will be equal to the input signal from highest axle speed unit 120 divided by the raw axle speed of axle 2, provided that this calculation is within±2% of this function's previous program cycle's output signal. If the calculation is not within ±2% of this function's previous program cycle's output signal it will be limited to 102% or 98% respectively, of this function's previous program cycle's output signal.

Also included in Module D, speed normalization unit 100, is axle 3 normalization factor unit, designated 108, which receives signals from the following as input signals thereto:

NORMALIZATION ENABLE—This signal is the output signal of normalization enable unit 102. When the conditions are right to recalculate the normalization scaling factor, this signal will be a logical "1". All other times, this signal will be a logical "0".

HIGHEST AXLE SPEED (HAS)—This signal is the output signal from highest axle speed unit 120. This signal is the highest axle speed signal of the four axles.

RAW AXLE SPEED 3—This signal is the speed of the wheel/axle set which is being monitored for slippage. It is externally supplied to the axle 3 normalization factor unit 108 by an outside source (i.e., speed pickup).

This axle 3 normalization factor unit 108 calculates the wheel speed normalization factor for axle 3. When this factor is calculated, it is clamped so that it cannot change more than ±2% from its previous value. This is used to minimize the effect of an anomalous speed signal right at the moment the factor is being calculated.

If the input signal from normalization enable unit 102 is equal to a logical "0", then the output signal of axle 3 normalization factor unit 108 will be the previous program cycle's output signal from this function. If the input signal from normalization enable unit 102 is equal to a logical "1" then the output signal of the axle 3 normalization factor unit 108 is calculated in the following manner:

The output signal from this function will be equal to the input signal from highest axle speed unit 120 divided by the raw axle speed of axle 3, provided that this calculation is within ±2% of this function's previous program cycle's output signal. If the calculation is not within ±2% of this function's previous program cycle's output signal it will be limited to 102% or 98% respectively, of this function's previous program cycle's output signal.

In addition. Module D. speed normalization unit 100 also has an axle 4 normalization factor unit, designated 110. which receives signals from the following as input signals thereto:

NORMALIZATION ENABLE—This signal is the output signal of normalization unit 102. When the conditions are right to recalculate the normalization scaling factor, this signal will be a logical "1". All other times, this signal will be a logical "0".

HIGHEST AXLE SPEED (HAS)—This signal is the output signal from highest axle speed unit 120. This signal is the highest axle speed signal of the four axles.

RAW AXLE SPEED 4—This signal is the speed of the wheel/axle set which is being monitored for slippage. It is externally supplied to the axle 4 normalization factor unit 110 by an outside source (i.e., speed pickup).

This axle 4 normalization factor unit 110 calculates the wheel speed normalization factor for axle 4. When this factor is calculated, it is clamped so that it cannot change more than ±2% from its previous value. This is used to minimize the effect of an anomalous speed signal right at the moment the factor is being calculated.

If the input signal from normalization enable unit 102 is equal to a logical "0", then the output signal of axle 4 normalization factor unit 110 will be the previous program cycle's output signal from this function. If the input signal from normalization enable unit 102 is equal to a logical "1" then the output signal of the axle 4 normalization factor unit 110 is calculated in the following manner:

The output signal from this function will be equal to the input signal from highest axle speed unit 120 divided by the raw axle speed of axle 4, provided that this calculation is within ±2% of this function's previous program cycle's output signal. If the calculation is not within ±2% of this function's previous program cycle's output signal it will be limited to 102% or 98% respectively, of this function's previous program cycle's output signal.

Module D, speed normalization unit 100, also includes an axle 1 normalized speed unit, designated 112, which receives signals from the following as input signals thereto:

AXLE 1 NORMALIZATION FACTOR—This signal is the output signal of axle 1 normalization factor unit 104. This signal is the scaling factor used to normalize the respective axle speed.

RAW AXLE SPEED 1—This signal is the speed of the wheel/axle set which is being monitored for slippage. It is externally supplied to the axle 1 normalized speed unit 112 by an outside source (i.e., speed pickup).

This axle 1 normalized speed unit's function is to multiply the scale factor times the raw axle speed, producing a normalized axle speed for axle 1. The output signal of the axle 1 normalized speed unit 112 is the multiplication of the externally supplied input signal from raw axle speed 1 times the input signal from axle 1 normalization factor unit 104. This function produces output signal D-1 which is used by other modules.

Also included in Module D, speed normalization unit 100, is axle 2 normalized speed unit, designated 114, which receives signals from the following as input signals thereto:

AXLE 2 NORMALIZATION FACTOR—This signal is the output signal of axle 2 normalization factor unit 106. This signal is the scaling factor used to normalize the respective axle speed.

RAW AXLE SPEED 2—This signal is the speed of the wheel/axle set which is being monitored for slippage. It is externally supplied to the axle 2 normalized speed unit 114 by an outside source (i.e., speed pickup).

This axle 2 normalized speed unit's function is to multiply the scale factor times the raw axle speed, producing a normalized axle speed for axle 2. The output signal of axle 2 normalized speed unit 114 is the multiplication of the externally supplied input signal from raw axle speed 2 times the input signal from axle 2 normalization factor unit 106. This function produces output signal D-2 which is used by other modules.

Additionally, speed normalization unit 100 Module D includes axle 3 normalized speed unit, designated 116, which receives signals from the following as input signals thereto:

AXLE 3 NORMALIZATION FACTOR—This signal is the output signal of axle 3 normalization factor unit 108. This signal is the scaling factor used to normalize the respective axle speed.

RAW AXLE SPEED 3—This signal is the speed of the wheel/axle set which is being monitored for slippage. It is externally supplied to the axle 3 normalized speed unit 116 by an outside source (i.e., speed pickup).

This axle 3 normalized speed unit's function is to multiply the scale factor times the raw axle speed, producing a normalized axle speed for axle 3. The output signal of axle 3 normalized speed unit 116 is the multiplication of the externally supplied input signal from raw axle speed 3 times the input signal from axle 3 normalization factor 108. This function produces output signal D-3 which is used by other modules.

In Module D, speed normalization unit 100, there is also an axle 4 normalized speed unit, designated 118, which receives signals from the following as input signals thereto:

AXLE 4 NORMALIZATION FACTOR—This signal is the output signal of axle 4 normalization factor unit 110. This signal is the scaling factor used to normalize the respective axle speed.

RAW AXLE SPEED 4—This signal is the speed of the wheel/axle set which is being monitored for slippage. It is externally supplied to the axle 4 normalized speed unit 118 by an outside source (i.e., speed pickup).

This axle 4 normalized speed unit's function is to multiply the scale factor times the raw axle speed, producing a normalized axle speed for axle 4.

The output signal of axle 4 normalized speed unit 118 is the multiplication of the externally supplied input signal from raw axle speed 4 times the input signal from axle 4 normalization factor 110. This function produces output signal D-4 which is used by other modules.

Finally, speed normalization unit 100 Module D also includes a highest axle speed unit, designated 120, which receives signals from the following as input signals thereto:

AXLE 1 NORMALIZED SPEED—This signal is the output signal from axle 1 normalized speed unit 112. This signal is the speed of wheel/axle set 1, after it has been normalized to correct for wheel size differences.

AXLE 2 NORMALIZED SPEED—This signal is the output signal from axle 2 normalized speed unit 114. This signal is the speed of wheel/axle set 2, after it has been normalized to correct for wheel size differences.

AXLE 3 NORMALIZED SPEED—This signal is the output signal from axle 3 normalized speed unit 116. This signal is the speed of wheel/axle set 3, after it has been normalized to correct for wheel size differences.

AXLE 4 NORMALIZED SPEED—This signal is the output signal from axle 4 normalized speed unit 118. This signal is the speed of wheel/axle set 4, after it has been normalized to correct for wheel size differences.

The function of this highest axle speed unit 120 is to compare all of the vehicle's normalized axle speed signals and select the highest for an output signal.

The output signal of the highest axle speed unit 120 is the greatest of the four input signals from the axle 1, 2, 3 and 4 normalized speed units 112, 114, 116, and 118.

The foregoing description of the invention is a very specific definition of a presently preferred embodiment, to enable one skilled in the art to practice the invention.

The presently preferred embodiment presented above provides an improved wheel spin traction control arrangement designed to work with variable per truck force modulation systems found on many of today's AC motor driven rail vehicle propulsion systems on passenger type railway vehicles having a plurality of axles upon which wheels are disposed.

It will be understood that various alterations and changes may be made by those skilled in the art without departing from the spirit and scope of the subject invention. Further, with the increased use of microprocessors and minicomputers, it is evident that the various #unctions may be carried out and processed by a suitably programmed computer which receives the different input signals and produces the appropriate output signals. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

We claim:

1. An apparatus for providing relative spin speed traction control on a railway vehicle having steel wheels which operates on steel rails, said apparatus comprising:

(a) a wheel spin detection means disposed on such railway vehicle and connected to receive a first plurality of input signals, at least one of said first plurality of said input signals being an externally generated and communicated axle rate signal which is representative of an acceleration/deceleration rate of a particular wheel/axle set being monitored with respect to wheel slippage, for generating and communicating a spin speed selection output signal representative of an actual spin speed value and for generating and communicating a respective axle's wheel spin detection signal;

(b) a wheel spin correction means disposed on such railway vehicle and connected to receive a second plurality of input signals, one of said second plurality of said input signals being an externally generated and communicated power/brake signal which is representative of when such railway vehicle is in one of a braking mode and a non braking mode and at least two of said second plurality of said input signals being said spin speed selection output signal representative of an actual spin speed value and said respective axle's wheel spin detection signal generated and communicated from said wheel spin detection means, for determining and communicating an appropriate output force command signal selected from remove, hold and apply and for generating and communicating an output signal representative of one of a spin correction being in progress for a respective axle and an absence of a spin correction being in progress for such respective axle;

(c) a wheel spin axle force command signal generating means disposed on such railway vehicle and connected to receive each of such externally generated and communicated power/brake signal, said output force command signal selected from remove, hold and apply and said output signal representative of said one of said spin correction being in progress on a respective axle and said absence of said spin correction being in progress on such respective axle for generating a respective truck 1 and truck 2 re-application jerk limiting output signal and communicating said respective truck 1 and truck 2 re-application jerk limiting output signal to respective truck 1 and truck 2 propulsion control units disposed on such railway vehicle and for generating and communicating an output signal representative of one of a spin correction occurring and an absence of said spin correction occurring; and (d) a speed normalization means disposed on such railway vehicle and connected to receive each of said raw axle speed signals, said power/brake signal, said axle rate signals and said output signal representative of car level spin for generating and communicating an output signal representative of normalized axle speeds and an output signal representative of a highest axle speed.

2. An apparatus for providing relative spin speed traction control on a railway vehicle, according to claim 1, wherein said wheel spin detection means includes a lowest axle speed unit connected to receive said normalized axle speed signals from each of such respective axles on such vehicle as input, said lowest axle speed unit selects and communicates an output signal representative of a lowest axle speed.

3. An apparatus for providing relative spin speed traction control on a railway vehicle, according to claim 2, wherein said wheel spin detection means includes an axle speed to lowest axle speed comparison unit connected to receive each of said output signal representative of said lowest axle speed and said normalized axle speed for a respective axle being monitored, said axle speed to lowest axle speed comparison unit calculates a difference between said lowest axle speed and a respective axle speed and communicates said difference.

4. An apparatus for providing relative spin speed traction control on a railway vehicle, according to claim 3, wherein said wheel spin detection means includes a speed difference constant unit connected to receive said normalized axle speed for each respective axle for generating and communicating an output signal representing a speed varying value.

5. An apparatus for providing relative spin speed traction control on a railway vehicle, according to claim 4, wherein said wheel spin detection means includes a speed difference detection unit connected to receive each of said speed difference constant output signal and said axle speed to lowest axle speed comparison output signal for detecting if a speed difference is present and for generating and communicating an output signal representative of one of a difference being detected and an absence of a difference being detected.

6. An apparatus for providing relative spin speed traction control on a railway vehicle, according to claim 5, wherein said wheel spin detection means includes a relative speed constant unit connected to receive said normalized axle speed signal from respective axles for generating and communicating an axle speed varying constant.

7. An apparatus for providing relative spin speed traction control on a railway vehicle, according to claim 6, wherein said wheel spin detection means includes a probable spin rate constant unit connected to receive said normalized axle speed from respective axles for generating and communicating an output signal representative of an axle acceleration rate range where wheel spin can be expected, said output signal representative of said axle acceleration rate range being a probable spin rate constant.

8. An apparatus for providing relative spin speed traction control on a railway vehicle, according to claim 7, wherein said wheel spin detection means includes a spin rate band unit connected to receive each of said axle rate signal which is representative of an acceleration/deceleration rate of a wheel/axle set being monitored and said output signal from said probable spin rate constant unit for comparing said axle rate signal to said output signal from said probable spin rate constant unit, said spin rate band unit generating and communicating an output signal representative of one of a logical 0 and a logical 1.

9. An apparatus for providing relative spin speed traction control on a railway vehicle, according to claim 8, wherein said wheel spin detection means includes a relative speed summation unit connected to receive each of said axle rate signal for a respective axle being monitored, said output signal from said spin rate band unit, said output signal from said probable spin rate constant unit and a wheel spin enable signal which indicates one of a wheel spin is in process and an absence of a wheel spin in process for generating and communicating an output signal representative of a relative spin speed of an axle being monitored while it is in both a wheel spin detection range and a wheel spin correction range.

10. An apparatus for providing relative spin speed traction control on a railway vehicle, according to claim 9, wherein said wheel spin detection means includes a relative spin speed detector unit connected to receive output signals from both said relative speed summation unit and said relative speed constant unit for generating and communicating an output signal representative of actual relative spin speed detection.

11. An apparatus for providing relative spin speed traction control on a railway vehicle, according to claim 10, wherein said wheel spin detection means includes a detection unit connected to receive output signals from said relative spin speed detector unit and said speed difference detection unit for generating and communicating an output signal representative of a respective axle's wheel spin detection.

12. An apparatus for providing relative spin speed traction control on a railway vehicle, according to claim 11, wherein said wheel spin detection means includes a spin speed selection unit connected to receive output signals from said relative speed summation unit and said axle speed to lowest axle speed comparison unit for determining one of said output signal representative of said axle's relative spin speed and said output signal representative of said speed difference will be used as said spin speed for spin control and for communicating an output signal representative of an actual spin speed value.

13. An apparatus for providing relative spin speed traction control on a railway vehicle, according to claim 1, wherein said wheel spin correction means includes a spin speed constant connected to receive a signal representative of said normalized axle speed for each respective axle for generating and communicating an output signal representative of a speed varying spin speed constant.

14. An apparatus for providing relative spin speed traction control on a railway vehicle, according to claim 13, wherein said wheel spin correction means includes a spin speed disable unit connected to receive output signals from each of said spin speed selection unit and said spin speed constant unit and a wheel spin enable signal which indicates one of a spin correction is in progress and an absence of a spin correction being in progress, said spin speed disable unit for determining and communicating an output signal representative of an appropriate point where a spin has been corrected.

15. An apparatus for providing relative spin speed traction control on a railway vehicle, according to claim 14, wherein said wheel spin correction means includes a timer table connected to receive a signal from said spin speed selection unit for generating and communicating a timeout value.

16. An apparatus for providing relative spin speed traction control on a railway vehicle, according to claim 15, wherein said wheel spin correction means includes an enable timer connected to receive signals from said timer table and said wheel spin enable signal, said enable timer begins a timeout countdown and communicates an output signal representative of when said timer has counted down to zero.

17. An apparatus for providing relative spin speed traction control on a railway vehicle, according to claim 16, wherein said wheel spin correction means includes an axle force command unit connected to receive an externally generated power/brake signal, said output signal from said wheel spin enable unit and an output signal from said spin speed unit for generating and communicating an output signal representative of an appropriate output force command of one of remove, hold and apply.

18. An apparatus for providing relative spin speed traction control on a railway vehicle, according to claim 17, wherein said wheel spin correction means includes a wheel spin enable unit connected to receive an externally generated power/brake signal, and output signals from said detection unit, said enable timer unit and said spin speed disable unit for generating and communicating an output signal that indicates one of a spin correction being in progress and an absence of a spin correction being in progress.

19. An apparatus for providing relative spin speed traction control on a railway vehicle, according to claim 1, wherein said wheel spin axle force command signal generating means includes a per axle to per truck determination unit for each respective truck on a vehicle, said per axle to per truck determination unit for said each respective truck on such vehicle connected to receive output signals from said axle force command unit for each respective axle on a truck for generating and communicating an output signal representative of an appropriate output force command selected from one of remove, hold and apply.

20. An apparatus for providing relative spin speed traction control on a railway vehicle, according to claim 19, wherein said wheel spin axle force command signal generating means includes a wheel spin enable "OR" unit for each respective truck on a vehicle, said wheel spin enable "OR" unit connected to receive output signals from said wheel spin enable unit for each respective axle on said truck for generating and communicating an output signal representative of one of an axle on a respective truck being enabled to control a spin and an absence of an axle on a respective truck being enabled to control a spin.

21. An apparatus for providing relative spin speed traction control on a railway vehicle, according to claim 20, wherein said wheel spin axle force command signal generating means includes a spin control interface unit for each respective truck on a vehicle connected to receive an externally generated signal from power/brake, and output signals from said per axle to per truck determination unit for such each respective truck and from said wheel spin enable "OR" unit for such each respective truck for generating and communicating an output signal representative of a percentage of a propulsion demand for such each respective truck.

22. An apparatus for providing relative spin speed traction control on a railway vehicle, according to claim 21, wherein said wheel spin axle force command signal generating means includes a car level spin indication unit connected to receive input signals from each respective said wheel spin enable "OR" unit for generating and communicating an output signal indicative of one of a spin correction occurring on any of such vehicle's axles and an absence of a spin correction occurring on any of such vehicle's axles.

23. An apparatus for providing relative spin speed traction control on a railway vehicle, according to claim 22, wherein said wheel spin axle force command signal generating means includes a re-application jerk limit unit for such each respective truck on a vehicle connected to receive output signals from said spin control interface unit for such each respective truck and from said wheel spin enable "OR" unit for such each respective truck for generating and communicating an output signal to such vehicle's respective propulsion control unit.

24. An apparatus for providing relative spin speed traction control on a railway vehicle, according to claim 1, wherein said speed normalization means includes a normalization enable unit connected to receive an externally generated signal from power/ brake and an externally generated axle rate signal for each respective axle which is indicative of the acceleration/deceleration rate for such each respective axle and output signals from a car spin unit and a highest axle speed unit for generating and communicating an output signal representative of an optimum time for performing a wheel speed normalization process.

25. An apparatus for providing relative spin speed traction control on a railway vehicle, according to claim 24, wherein said speed normalization means includes a normalization factor unit for such each respective axle on a vehicle connected to receive output signals from said normalization enable unit, a highest axle speed unit and from an externally generated raw axle speed signal for such each respective axle for generating and communicating an output signal representative of a wheel speed normalization factor for such each respective axle on a vehicle.

26. An apparatus for providing relative spin speed traction control on a railway vehicle, according to claim 25, wherein said speed normalization means includes a normalized speed unit for such each respective axle on such vehicle connected to receive output signals from such each respective said normalization factor unit and such externally generated raw axle speed signal for such each respective axle for generating and communicating an output signal representative of a normalized axle speed for such each respective axle on a vehicle.

27. An apparatus for providing relative spin speed traction control on a railway vehicle, according to claim 26, wherein said speed normalization means includes a highest axle speed unit connected to receive output signals from said each respective said normalized speed unit for generating and communicating an output signal representative of a highest axle speed.

* * * * *